(12) United States Patent
Fridman-Mintz

(10) Patent No.: US 12,592,230 B2
(45) Date of Patent: Mar. 31, 2026

(54) RECOGNITION OR SYNTHESIS OF HUMAN-UTTERED HARMONIC SOUNDS

(71) Applicant: Boris Fridman-Mintz, Mexico City (MX)

(72) Inventor: Boris Fridman-Mintz, Mexico City (MX)

( * ) Notice: Subject to any disclaimer, the term of this patent is extended or adjusted under 35 U.S.C. 154(b) by 344 days.

(21) Appl. No.: 18/290,574

(22) PCT Filed: May 13, 2022

(86) PCT No.: PCT/IB2022/054502
§ 371 (c)(1),
(2) Date: Nov. 14, 2023

(87) PCT Pub. No.: WO2022/243828
PCT Pub. Date: Nov. 24, 2022

(65) Prior Publication Data
US 2024/0363105 A1      Oct. 31, 2024

Related U.S. Application Data

(63) Continuation of application No. 17/322,913, filed on May 18, 2021, now Pat. No. 11,545,143.

(51) Int. Cl.
*G10L 15/187* (2013.01)
*G10L 15/20* (2006.01)
(Continued)

(52) U.S. Cl.
CPC ............ *G10L 15/187* (2013.01); *G10L 15/20* (2013.01); *G10L 21/0232* (2013.01);
(Continued)

(58) Field of Classification Search
CPC ... G10L 15/187; G10L 15/20; G10L 21/0232; G10L 21/0264; G10L 25/78;
(Continued)

(56) References Cited

U.S. PATENT DOCUMENTS 3,622,706 A * 11/1971 Kalfaian ................. G10L 25/00
704/250
5,406,635 A     4/1995 Jarvinen
(Continued)

FOREIGN PATENT DOCUMENTS

CN      102 208 186      10/2011
EP          3739571      11/2020
(Continued)

OTHER PUBLICATIONS

Yeh Huann Goh et al. Jul. 22, 2013, IET Signal Processing, vol. 8 Iss. 2, pp. 167-175. (Year: 2013).*
(Continued)

*Primary Examiner* — Bhavesh M Mehta
*Assistant Examiner* — Cameron Kenneth Young
(74) *Attorney, Agent, or Firm* — Louis J. Hoffman; David S. Alavi

(57)      ABSTRACT
Within each harmonic spectrum of a sequence of spectra derived from analysis of a waveform representing human speech are identified two or more fundamental or harmonic components that have frequencies that are separated by integer multiples of a fundamental acoustic frequency. The highest harmonic frequency that is also greater than 410 Hz is a primary cap frequency, which is used to select a primary phonetic note that corresponds to a subset of phonetic chords from a set of phonetic chords for which acoustic spectral is available. The spectral data can also include frequencies for primary band, secondary band (or secondary note), basal band, or reduced basal band acoustic components, which can be used to select a phonetic chord from the subset of phonetic chords corresponding to the selected primary note.

27 Claims, 11 Drawing Sheets

(51) Int. Cl.

| | |
|---|---|
| *G10L 21/0232* | (2013.01) |
| *G10L 21/0264* | (2013.01) |
| *G10L 25/78* | (2013.01) |

(52) U.S. Cl.

CPC .......... *G10L 21/0264* (2013.01); *G10L 25/78* (2013.01); *G10L 2025/783* (2013.01)

(58) Field of Classification Search

CPC ... G10L 2025/783; G10L 15/08; G10L 13/02; G10L 25/90; G10L 2025/935; G10L 25/93; G10L 25/18

See application file for complete search history.

(56) References Cited

U.S. PATENT DOCUMENTS

| | | | | |
|---|---|---|---|---|
| 6,925,435 | B1 * | 8/2005 | Gao .................... | G10L 21/0208 704/226 |
| 7,516,067 | B2 * | 4/2009 | Seltzer ................ | G10L 21/0208 704/226 |
| 7,613,612 | B2 | 11/2009 | Kenmochi et al. | |
| 7,634,401 | B2 * | 12/2009 | Fukada ................ | G10L 15/187 704/215 |
| 8,566,088 | B2 | 10/2013 | Pinson et al. | |
| 8,606,566 | B2 * | 12/2013 | Li ....................... | G10L 21/0208 704/211 |
| 8,812,312 | B2 * | 8/2014 | Fukuda .................. | G10L 15/02 704/231 |
| 9,087,513 | B2 | 7/2015 | Ichikawa et al. | |
| 9,147,393 | B1 | 9/2015 | Fridman-Mintz | |
| 9,190,072 | B2 | 11/2015 | Ichikawa | |
| 9,460,707 | B1 | 10/2016 | Fridman-Mintz | |
| 9,570,072 | B2 | 2/2017 | Pinson | |
| 9,747,892 | B1 | 8/2017 | Fridman-Mintz | |
| 9,966,060 | B2 * | 5/2018 | Naik ...................... | G10L 13/08 |
| 11,545,143 | B2 | 1/2023 | Fridman-Mintz | |
| 2004/0181411 | A1 * | 9/2004 | Gao ...................... | G10L 19/265 704/262 |
| 2006/0287690 | A1 * | 12/2006 | Bouchataoui ...... | A61N 1/36039 607/57 |
| 2009/0216535 | A1 * | 8/2009 | Entlis ...................... | G10L 15/02 704/E15.045 |

| | | | | |
|---|---|---|---|---|
| 2013/0085762 | A1 * | 4/2013 | Mano .................... | G10L 19/265 704/500 |
| 2018/0332411 | A1 * | 11/2018 | Francart ............. | A61N 1/36039 |
| 2020/0294486 | A1 * | 9/2020 | Daido .................... | G06N 3/045 |

FOREIGN PATENT DOCUMENTS

| | | |
|---|---|---|
| JP | 2009003162 | 4/2012 |
| JP | 2020166299 | 10/2020 |
| KR | 10-2016-0053582 | 5/2016 |
| WO | 2020-190317 A1 | 9/2020 |

OTHER PUBLICATIONS

Huann et al, "Robust speech recognition using harmonic features," IET Signal Processing, The Institution of Engineering and Technology, vol. 8, No. 2 pp. 168-175 (Michael Farrady House, Apr. 1, 2014).

Stokes-Rees, I. (2000). A Study of the Automatic Speech Recognition Process and Speaker Adaption., University of Waterloo., https://dspacemainprd01.lib.uwaterloo.ca/server/api/core/bitstreams/3ab4303a-83d6-4c3f-a1a6-8ea11d9c184a/contentStokes-Rees, I. (2000).

Alías, F., Socoró, J. C., & Sevillano, X. (2016). A Review of Physical and Perceptual Feature Extraction Techniques for Speech, Music and Environmental Sounds. Applied Sciences, 6(5), 143. https://doi.org/10.3390/app6050143.

Chesnaye, M.A., Burghardt, M.R., & Valkenier, B, "Speech re-synthesis with harmonic frequencies for increasing noise robustness in ASR systems," Bachelor Thesis, University of Groningen, Faculty of Science and Engineering, 2011 (published Feb. 15, 2018).

D. Giannoulis, A. Klapuri and M. D. Plumbley, "Recognition of harmonic sounds in polyphonic audio using a missing feature approach," 2013 IEEE International Conference on Acoustics, Speech and Signal Processing, Vancouver, BC, Canada, 2013, pp. 8658-8662.

Bruno H. Repp, "Categorical Perception: Issues, Methods, Findings," Speech and Language: Advances in Basic Research and Practice, vol. 10 p. 243 (Academic Press 1984), https://doi.org/10.1016/B978-0-12-608610-2.50012-1.

IBM; "Speech Recognition"; published online at https://www.ibm.com/cloud/learn/speech-recognition on or around Sep. 2, 2020; downloaded Oct. 13, 2022.

Dieter Maurer, Acoustic of the Vowel: Preliminaries, Peter Lang AG, Bern 2016.

* cited by examiner

| | Phonetic note (IPA analogy) | Focal Freq. (Hz) | Correlated phonetic articulations (International Phonetic Association) |
|---|---|---|---|
| 1 | ʔ | <410 | m, ɱ, n, ɳ, ɲ, ŋ, ɴ, ʙ, r, ʀ, ʋ, ɾ, ɽ, ʋ, ɹ, ɻ, j, ɰ, l, ɭ, ʎ, ʟ, ṽ |
| 2 | u | 581 | u |
| 3 | o | 881 | o |
| 4 | ʊ | 1,013 | ʊ, ɤ, ɒ |
| 5 | ɔ | 1,127 | ɔ, o, ɯ |
| 6 | ʌ | 1,305 | ʌ, ə, ɒ, ə, ɜ, ɯ (chord ʌ|u), œ (chord ʌ|u) |
| 7 | œ | 1,440 | œ, ɶ, ɵ, ɯ, ɤ |
| 8 | ə | 1,551 | ə, œ |
| 9 | æ | 1,698 | æ, a, ɐ (chord æ|ʊ) |
| 10 | a | 1,827 | a, æ, œ |
| 11 | ʏ | 1,983 | ʏ, ʉ, ø, ɵ (chord ʏ|ʌ), ɵ (chord ʏ|œ) |
| 12 | y | 2,317 | y, ʉ, ɨ, ɜ, ø (chord y|ə) |
| 13 | ɜ | 2,567 | ɜ, i (chord i|ɜ), ɪ (chord ɪ|ɜ) |
| 14 | ɘ | 2,807 | ɤ, e (chord ɘ|y) |
| 15 | e | 3,052 | e, ɨ (chord e|u), ɪ (chord e|u), ə (chords e|o & e|ə), ɑ (chord e|ə) |
| 16 | ɪ | 3,402 | ɪ (chords ɪ & ɪ|ɜ), ɨ (chord e|u), ɛ (chord ɪ|o) |
| 17 | ɑ | 3,633 | ɑ (chords ɑ|ʊ & ɑ|o) |
| 18 | ɛ | 3,840 | ɛ (chord ɛ|a) |
| 19 | i | 4,160 | i (chords i|ɜ, i|ɛ & i|y) |

FIG. 2

| Identified chord | Confidence | Proximal chord | Confidence | Primary cap | Secondary Cap |
|---|---|---|---|---|---|
| u | 0.8 | ũ | 0.2 | 540 | |
| u | 0.9 | ũ | 0.1 | 569 | |
| u | 0.8 | o | 0.2 | 634 | |
| o | 0.5 | u | 0.5 | 736 | |
| o | 0.7 | u | 0.3 | 788 | |
| o | 0.9 | u | 0.1 | 849 | |
| ʊ | 0.8 | o | 0.2 | 984 | |
| ʊ | 0.9 | o | 0.1 | 1003 | |
| ʊ | 0.9 | o | 0.1 | 1005 | |
| ʊ | 1 | o | 0 | 1013 | |
| ʊ | 0.9 | ɔ | 0.1 | 1019 | |
| ʊ | 0.7 | ɔ | 0.3 | 1051 | |
| ʊ | 0.5 | ɔ | 0.5 | 1067 | |
| ʊ | 0.5 | ɔ | 0.5 | 1067 | |
| ɔ | 0.6 | ʊ | 0.4 | 1078 | |
| ɔ | 0.7 | ʊ | 0.3 | 1098 | |
| ɔ | 1 | ʊ | 0 | 1122 | |
| ɔ | 0.9 | ʌ | 0.1 | 1139 | |
| ɔ | 0.9 | ʌ | 0.1 | 1141 | |
| ɔ | 0.8 | ʌ | 0.2 | 1168 | |
| ʌ | 0.5 | ɔ | 0.5 | 1224 | |
| ʌ | 0.6 | ɔ | 0.4 | 1241 | |
| ʌ\|u | 0.6 | ɔ\|u | 0.4 | 1241 | 517 |
| ʌ | 0.7 | ɔ | 0.3 | 1251 | |
| ʌ | 0.7 | ɔ | 0.3 | 1253 | |
| ʌ | 0.7 | ɔ | 0.3 | 1256 | |
| ʌ | 0.8 | ɔ | 0.2 | 1275 | |
| ʌ | 1 | ɔ | 0 | 1297 | |
| ʌ | 1 | ɔ | 0 | 1297 | |
| ʌ\|u | 1 | ɔ\|u | 0 | 1304 | 559 |
| ʌ | 0.9 | œ | 0.1 | 1315 | |
| ʌ | 0.6 | œ | 0.4 | 1364 | |
| œ | 0.5 | ʌ | 0.5 | 1377 | |
| œ | 0.6 | ʌ | 0.4 | 1387 | |
| œ | 0.7 | ʌ | 0.3 | 1398 | |
| œ | 0.7 | ʌ | 0.3 | 1405 | |
| œ | 0.9 | ʌ | 0.1 | 1420 | |
| œ | 0.9 | ʌ | 0.1 | 1425 | |
| œ | 0.8 | ə | 0.2 | 1467 | |
| œ | 0.6 | ə | 0.4 | 1483 | |
| ə | 0.7 | œ | 0.3 | 1521 | |
| ə\|o | 1 | œ\|o | 0 | 1548 | 774 |
| ə\|u | 0.9 | æ\|u | 0.1 | 1560 | 668 |
| æ | 0.8 | ə | 0.2 | 1665 | |
| æ\|ʊ | 0.7 | a\|ʊ | 0.3 | 1733 | 1011 |
| æ | 0.7 | a | 0.3 | 1738 | |

FIG. 3A

| Identified chord | Confidence | Proximal chord | Confidence | Primary cap | Secondary Cap |
|---|---|---|---|---|---|
| æ\|o | 0.6 | a\|o | 0.4 | 1743 | 872 |
| æ\|o | 0.6 | a\|o | 0.4 | 1753 | 876 |
| a | 0.6 | æ | 0.4 | 1771 | |
| a | 0.7 | æ | 0.3 | 1782 | |
| a\|ɔ | 0.7 | æ\|ɔ | 0.3 | 1794 | 1104 |
| a | 0.8 | æ | 0.2 | 1799 | |
| a | 0.9 | æ | 0.1 | 1809 | |
| ɤ | 0.6 | a | 0.4 | 1927 | |
| ɤ\|u | 0.7 | a\|u | 0.3 | 1939 | 539 |
| ɤ | 0.8 | a | 0.2 | 1957 | |
| ɤ | 0.9 | y | 0.1 | 2005 | |
| ɤ\|ʌ | 0.9 | y\|ʌ | 0.1 | 2032 | 1315 |
| ɤ\|œ | 0.7 | y\|œ | 0.3 | 2079 | 1417 |
| ɤ | 0.6 | y | 0.4 | 2107 | |
| y | 0.5 | ɤ | 0.5 | 2152 | |
| y | 0.5 | ɤ | 0.5 | 2157 | |
| y\|ə | 0.6 | ɤ\|ə | 0.4 | 2171 | 1510 |
| y | 0.6 | ɤ | 0.4 | 2179 | |
| y\|u | 0.6 | ɤ\|u | 0.4 | 2190 | 522 |
| y\|u | 0.7 | ɤ\|u | 0.3 | 2222 | 529 |
| y | 0.8 | ɤ | 0.2 | 2248 | |
| y | 0.8 | ɤ | 0.2 | 2255 | |
| y | 0.7 | ɜ | 0.3 | 2396 | |
| y\|ʌ | 0.6 | ɜ\|ʌ | 0.4 | 2415 | 1288 |
| y\|ə | 0.6 | ɜ\|ə | 0.4 | 2418 | 1581 |
| y\|ʌ | 0.6 | ɜ\|ʌ | 0.4 | 2422 | 1332 |
| ə | 0.5 | ɜ | 0.5 | 2691 | |
| ə\|ɤ | 1 | ɜ\|ɤ | 0 | 2806 | 2105 |
| ə\|ɤ | 0.9 | e\|ɤ | 0.1 | 2831 | 2069 |
| e\|o | 0.6 | ə\|o | 0.4 | 2960 | 740 |
| e\|ə | 0.8 | ə\|ə | 0.2 | 3007 | 1598 |
| e\|u | 0.9 | ə\|u | 0.1 | 3026 | 605 |
| e\|ʊ | 0.9 | ɪ\|ʊ | 0.1 | 3071 | 1024 |
| e | 0.8 | ɪ | 0.2 | 3125 | |
| e | 0.6 | ɪ | 0.4 | 3186 | |
| e\|u | 0.5 | ɪ\|u | 0.5 | 3218 | 671 |
| ɪ\|ɜ | 1 | e\|ɜ | 0 | 3388 | 2575 |
| ɪ | 0.9 | ɑ | 0.1 | 3428 | |
| ɪ\|ɜ | 0.7 | ɑ\|ɜ | 0.3 | 3472 | 2630 |
| ɪ\|o | 0.6 | ɑ\|o | 0.4 | 3494 | 932 |
| ɑ\|o | 0.7 | ɪ\|o | 0.3 | 3556 | 912 |
| ɑ\|ʊ | 1 | ɪ\|ʊ | 0 | 3623 | 1035 |
| ɛ\|a | 0.6 | ɑ\|a | 0.4 | 3765 | 1793 |
| ɛ\|a | 0.7 | ɑ\|a | 0.3 | 3776 | 1823 |
| i\|ɛ | 1 | ɛ | 0 | 4982 | 3875 |
| i\|ɜ | 1 | ɛ\|ɜ | 0 | 5025 | 2660 |
| i\|y | 1 | ɛ\|y | 0 | 5393 | 2194 |

FIG. 3B

RECOGNITION OR SYNTHESIS OF HUMAN-UTTERED HARMONIC SOUNDS

CROSS-REFERENCE TO RELATED APPLICATIONS

This application is a national stage of application Serial No. PCT/IB2022/054502 filed May 13, 2022, which claims the benefit and priority of U.S. application Ser. No. 17/322, 913, filed May 18, 2021, now U.S. Pat. No. 11,545,143.

FIELD OF THE INVENTION

The field of the present invention relates to recognition or synthesis of human-uttered speech. In particular, computer-implemented methods are disclosed for recognizing or synthesizing human-uttered harmonic sounds.

BACKGROUND

Some examples of speech processing or synthesizing apparatus or methods are disclosed in:

U.S. Pat. No. 5,406,635 entitled "Noise attenuation system" issued Apr. 11, 1995 to Jarvinen;

U.S. Pub. 2004/0181411 entitled "Voicing index controls for CELP speech encoding" published Sep. 16, 2004 in the name of Gao;

U.S. Pat. No. 6,925,435 entitled "Method and apparatus for improved noise reduction in a speech encoder" issued Aug. 2, 2005 to Gao;

U.S. Pat. No. 7,516,067 entitled "Method and apparatus using harmonic-model-based front end for robust speech recognition" issued Apr. 7, 2009 to Seltzer et al;

U.S. Pat. No. 7,634,401 entitled "Speech recognition method for determining missing speech" issued Dec. 15, 2009 to Fukuda;

U.S. Pat. No. 8,566,088 entitled "System and method for automatic speech to text conversion" issued Oct. 22, 2013 to Pinson et al;

U.S. Pat. No. 8,606,566 entitled "Speech enhancement through partial speech reconstruction" issued Dec. 10, 2013 to Li et al;

U.S. Pat. No. 8,812,312 entitled "System, method and program for speech processing" issued Aug. 19, 2014 to Fukuda et al;

U.S. Pat. No. 9,087,513 entitled "Noise reduction method, program product, and apparatus" issued Jul. 21, 2015 to Ichikawa et al;

U.S. Pat. No. 9,190,072 entitled "Local peak weighted-minimum mean square error (LPW-MMSE) estimation for robust speech" issued Nov. 17, 2015 to Ichikawa;

U.S. Pat. No. 9,570,072 entitled "System and method for noise reduction in processing speech signals by targeting speech and disregarding noise" issued Feb. 14, 2017 to Pinson;

Dieter Maurer, Acoustic of the Vowel: Preliminaries, Peter Lang A G, Bern 2016;

Bruno H. Repp, "Categorical Perception: Issues, Methods, Findings," SPEECH AND LANGUAGE: Advances in Basic Research and Practice, Vol. 10 p. 243 (Academic Press 1984), https://doi.org/10.1016/B978-0-12-608610-2.50012-1;

U.S. Pat. No. 9,147,393 entitled "Syllable based speech processing method" issued Sep. 29, 2015 to Fridman-Mintz (the inventor here);

U.S. Pat. No. 9,460,707 entitled "Method and apparatus for electronically recognizing a series of words based on syllable-defining beats" issued Oct. 4, 2016 to Fridman-Mintz (the inventor here); and U.S. Pat. No. 9,747,892 entitled "Method and apparatus for electronically synthesizing acoustic waveforms representing a series of words based on syllable-defining beats" issued Aug. 29, 2017 to Fridman-Mintz (the inventor here).

Each of the last three patents listed above (each issued to Fridman-Mintz) is incorporated by reference as if set forth herein in its entirety.

SUMMARY

A computer-implemented method is employed for identifying one or more phonetic chords (e.g., harmonic phones) represented within an electronic temporal waveform derived from an utterance of human speech. In some instances, from a temporal sequence of acoustic spectra derived from the waveform, each of a plurality of harmonic acoustic spectra among the temporal sequence are analyzed to identify within that harmonic acoustic spectrum two or more fundamental or harmonic components that each have an intensity exceeding a detection threshold. The identified components have frequencies that are separated by at least one integer multiple of a fundamental acoustic frequency associated with that acoustic spectrum. For at least some of the plurality of acoustic spectra, a primary cap frequency is identified, the primary cap frequency being greater than 410 Hz and also being the highest harmonic frequency among the identified harmonic components. For each acoustic spectrum for which a primary cap frequency is identified, that identified primary cap frequency is used to select as a primary phonetic note at least one phonetic note from among a set of phonetic notes. The selected primary phonetic note corresponds to a subset of phonetic chords from among a set of phonetic chords.

In some instances the acoustic spectra of the temporal sequence can correspond to one of a sequence of temporal sample intervals of the waveform; in other instances the acoustic spectra correspond to one of a sequence of distinct temporal segments during which a time-dependent acoustic spectrum of the waveform remains consistent with a single phonetic chord. In some instances, a phonetic chord can be selected on the basis of harmonic components present in the harmonic acoustic spectrum that include one or more of a primary band, a secondary band, a basal band, or a reduced basal band (each discussed below).

A computer-implemented method is employed for analyzing human-uttered speech and generating spectral data that can be used for the identification of harmonic phonetic chords in the method described above. For each phonetic chord, waveforms derived from respective utterances of that phonetic chord by one or more human test subjects are spectrally analyzed. The spectral analysis includes, for each electronic waveform, estimation of a fundamental acoustic frequency and identification of two or more fundamental or harmonic components, each having an intensity that exceeds a detection threshold and an acoustic frequency that is the fundamental acoustic frequency or a harmonic thereof. The primary cap frequency is identified and stored for each phonetic chord, along with acoustic frequencies for each identified fundamental or harmonic component. A focal frequency can be estimated for a primary phonetic note common to a subset of phonetic chords, using the observed primary cap frequencies (e.g., mean, or median). In some instances, stored spectral data can include data for one or more of a primary band, a secondary band, a basal band, or a reduced basal band.

A computer-implemented method is employed for synthesizing a temporal segment of an electronic waveform. Applying the waveform segment to an electroacoustic transducer produces sound of a phonetic chord. Data indicative of a primary phonetic note corresponding to the selected phonetic chord, and a focal frequency of that primary phonetic note, are used to determine a primary cap frequency. The primary cap frequency is (i) an integer multiple of a selected fundamental frequency, (ii) greater than 410 Hz, and (iii) closer to the focal frequency of the corresponding primary note than to focal frequencies of other phonetic notes. A harmonic component at the primary cap frequency is included in the waveform segment. The primary cap frequency is the largest frequency among harmonic components included in the waveform segment. The waveform segment can further include components at one or more harmonic frequencies of a primary band, a secondary band, a basal band, or a reduced basal band. The method can be repeated for each phonetic chord among a temporal sequence of multiple different harmonic or hybrid segments, along with inharmonic or silenced segments, and transitional segments between them, that together comprise a human utterance.

Objects and advantages pertaining to recognition or synthesis of human speech may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is an example of an acoustic spectral data table of basic phonetic notes, each followed by its defining focal frequency (e.g., mean, median, or otherwise characteristic cap frequency of corresponding phonetic note categories). It is proposed as an acoustically based reference for the categorical identification of harmonic phones as phonetic chords across all spoken languages. The third column indicates how the proposed set of phonetic notes is correlated with specific phonetic articulations, as represented by the canonical alphabet of the International Phonetic Association (IPA).

FIGS. 3A and 3B together constitute a single example acoustic spectral data table showing, for multiple recorded phonetic chords, their primary cap frequencies, and (if applicable) their secondary cap frequencies. The acoustic data were extracted from recordings of John Wells, Jill House, and Peter Ladefoged (available at phonetics.ucla.edu/course/chapter1/wells/wells.html).

Figure 1:
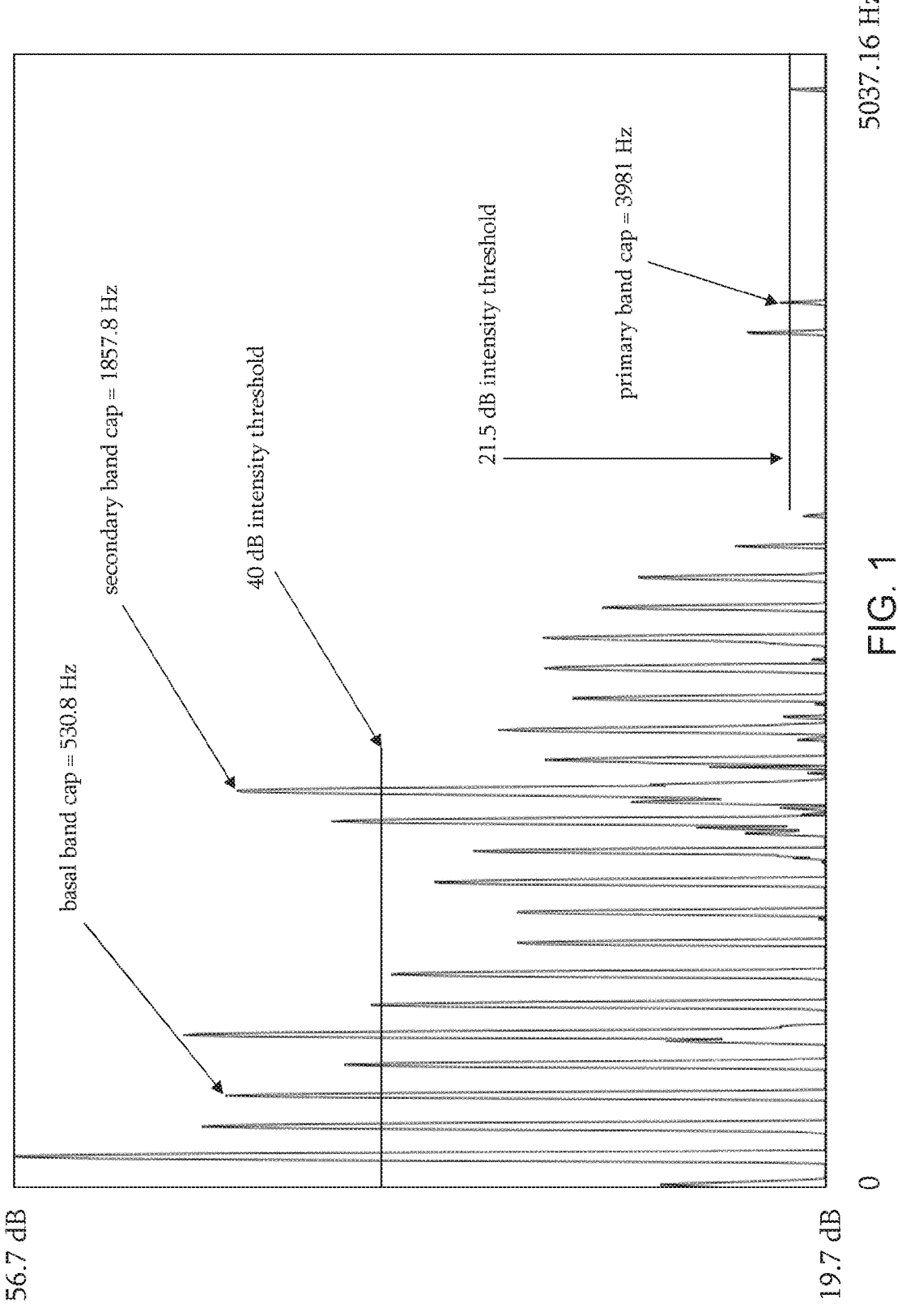
FIG. 1 is an example acoustic spectrum of a recorded natural [ɛla] phonetic chord. Intensity detection thresholds, basal cap frequency, secondary cap frequency, and primary cap frequency are indicated with their corresponding frequencies.

The examples or embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or inventive subject matter. Identical reference numbers refer to like elements throughout the different figures.

DETAILED DESCRIPTION

The following detailed description should be read with reference to the drawings. The detailed description illustrates principles of the subject matter by way of example, not by way of limitation.

Methods disclosed herein rely in part on the observation that, for phonetic chords (e.g., harmonic phones such as vowels, nasalized vowels, nasals, and approximants), harmonic acoustic spectral components (i.e., components having frequencies that are integral multiples of a fundamental acoustic frequency) carry the core of linguistically relevant information signaling those phonetic chords. The disclosed methods therefore include recognition or synthesis of phonetic chords that employ detection, identification, or generation of such harmonic components. Each phonetic note corresponds to a basic harmonic element (e.g., as in the example list of FIG. 2); each phonetic chord can include multiple harmonic frequencies in the context of a given phonetic note (e.g., as in the examples listed in FIGS. 3A and 3B).

As part of operating a speech recognition system, a computer-implemented method is employed to identify one or more phonetic chords that are represented within an electronic temporal waveform derived from an utterance of human speech. A temporal sequence of acoustic spectra is derived from the waveform in a suitable way (discussed further below), and some of those acoustic spectra are identified as being harmonic acoustic spectra, i.e., spectra that contain frequency components at one or more integer multiples of a fundamental acoustic frequency. For some or all of the harmonic acoustic spectra in the temporal sequence, two or more fundamental or harmonic components are identified that have respective intensities that exceed a detection threshold and that are separated by an integer multiple of a corresponding fundamental acoustic frequency for that harmonic acoustic spectrum. In some instances the fundamental frequency component might be missing or hidden for a number of reasons, e.g., interference with other nearby intense frequency components, attenuation by obstructions in an acoustic pathway, or weak production of low acoustic frequencies by speakers of small stature. Even if no fundamental component is present in a harmonic spectrum, that harmonic spectrum can nevertheless be characterized by the corresponding fundamental acoustic frequency, integer multiples of which separate harmonic components of the harmonic spectrum.

The fundamental and harmonic components typically manifest themselves as peaked spectral features rising above a background level (e.g., as in FIG. 1). The corresponding frequency of a component can be defined in a suitable way, e.g., the frequency of the maximum intensity or the centroid of the component. Non-zero width of the spectral features can result in some degree of uncertainty in assigning corresponding frequencies to those features, and typically there is some leeway in determining whether a spectral feature is an integer multiple of a fundamental frequency. The intensity of a component can be characterized in a suitable way, e.g., as a maximum or peak intensity or as an integrated intensity; intensities are typically expressed in relative terms (e.g., decibels), relative to a background noise level, a hearing threshold level, or another reference level. However the relative intensities are defined, a suitable detection threshold can be selected for deciding whether a given spectral feature has been "detected" and "identified" as a fundamental or harmonic component of a given harmonic spectrum. In some examples, a certain decibel level might be specified, above a selected reference level or above a background noise level. In some examples, the detection threshold can be frequency dependent, and so differ among the fundamental and harmonic components of a spectrum (e.g., as in FIG. 1).

For at least some of the harmonic acoustic spectra, a primary cap frequency is identified that is the highest harmonic frequency among the identified harmonic components, provided that such highest harmonic frequency is also greater than 410 Hz. For each harmonic acoustic spectrum for which such a primary cap frequency is identified, that primary cap frequency is used to select at least one phonetic note from among a set of basic phonetic notes (e.g., as in the table of FIG. 2). That selection is enabled because it has been observed, through recording and analysis of numerous human-uttered phonetic chords, that it is the primary cap frequency that most closely correlates with the particular phonetic chord being uttered. Data gathered for establishing the table of basic phonetic notes (e.g., as in FIG. 2) can include for each note a characteristic primary cap frequency (i.e., a focal frequency) and the primary note label with which it is correlated. Other phonetic note datasets can be employed; generation of such phonetic note datasets is discussed below. Other speech recognition systems frequently rely on the fundamental frequency, and in some cases two or three formants (temporally aligned peaks of intensities whose frequency values are defined as independent of the fundamental frequency), while substantially disregarding any harmonic components present in the acoustic spectrum, under the assumption that vowel perception and recognition are not based on categorical perception or feature analysis. The methods disclosed herein exploit those previously unutilized harmonic spectral components for identification of the corresponding phonetic chord and its one or more constituent phonetic notes, demonstrating that vowel identity can in some instances be based on prototype categorical perception.

For a given phonetic chord uttered at different pitches (i.e., with different fundamental frequencies), the primary cap frequency can vary, so a definitive identification (e.g., an unambiguous selection from the data table of FIG. 2) cannot always be realized. An example set of instantiated phonetic chord data is shown in the table of FIGS. 3A and 3B. Each instantiated primary cap frequency falls between focal frequencies of a pair of adjacent phonetic notes (e.g., in Table 2), or else is higher than the highest focal frequency. If between a pair of phonetic notes (labelled as "identified" and "proximal" chords in the table of FIGS. 3A and 3B), the instantiated phonetic chord can be identified as corresponding to one of those two notes (the "identified" chord in this example). If above the highest focal frequency (e.g., above 4160 Hz in the table of FIG. 2), the instantiated chord can be identified as corresponding to an [i] phonetic note. In some examples, an instantiated phonetic chord can be identified as corresponding to the phonetic note, of a pair of adjacent notes, that has a focal frequency closer to the instantiated primary cap frequency. The confidence columns in the table of FIGS. 3A and 3B indicate the relative closeness of the instantiated primary cap frequency to the corresponding pair of adjacent focal frequencies. Other suitable tests or algorithms can be employed for deciding among different possible phonetic chords that might be consistent with a particular instantiated harmonic spectrum. In some examples, an artificial intelligence (AI) system or a neural network can be trained to make the selection; in some examples so-called "fuzzy logic" algorithms can be employed. In some examples, identification of additional fundamental or harmonic spectral components (e.g., primary band, secondary band, basal band, as discussed below) of an observed harmonic spectrum can be employed to distinguish among different phonetic notes that have focal frequencies consistent with the observed primary cap frequency, secondary cap frequency, or basal cap frequency (discussed further below).

Some example methods can include deriving from the electronic temporal waveform the temporal sequence of acoustic spectra; in other examples the temporal sequence of acoustic spectra are already derived from the electronic waveform before performing the method. In either case the temporal sequence of acoustic spectra can be derived from the waveform in a suitable way, e.g., using an electronic spectrum analyzer to process the electronic waveform itself, or using Fourier transform techniques to process a numerical representation of the waveform.

In some examples, each of the acoustic spectra corresponds to one of a sequence of temporal sample intervals of the waveform; such sample intervals can be of equal durations, but that need not always be so. At least some of the acoustic spectra among such a temporal sequence can be classified as only one of harmonic, inharmonic, hybrid, or silenced. For at least some of the temporal sample intervals classified as harmonic, the methods described above or below can be employed to identify a phonetic chord among a set of phonetic chords (each including its characteristic combination of notes) as corresponding to that temporal sample interval of the electronic waveform.

In some examples, each of the acoustic spectra corresponds to one of a sequence of distinct temporal segments during which that time-dependent acoustic spectrum remains consistent with a single phonetic chord. A determination that the acoustic spectrum "remains consistent with a single phonetic chord" can be made without having already identified the chord; it need only be observed that no transition has occurred to an acoustic spectrum indicative of a different chord. At least some of the temporal segments can be classified as only one of harmonic, inharmonic, hybrid, or silenced based on the acoustic spectrum thereof. For at least some of the temporal segments classified as harmonic, the methods described above or below can be employed to identify a phonetic chord among a set of phonetic chords as corresponding to that temporal segment of the electronic waveform.

Identification of additional fundamental or harmonic frequencies, in addition to the primary cap frequency, can be employed to further facilitate identification of phonetic chords that correspond to harmonic spectra in the temporal sequence. In some instances, identification of those additional fundamental or harmonic components can be helpful in distinguishing among phonetic chords having similar primary cap frequencies. Additional fundamental or harmonic components can in some examples form one or more of a primary band, a secondary band, or a basal band.

Figure 4A:
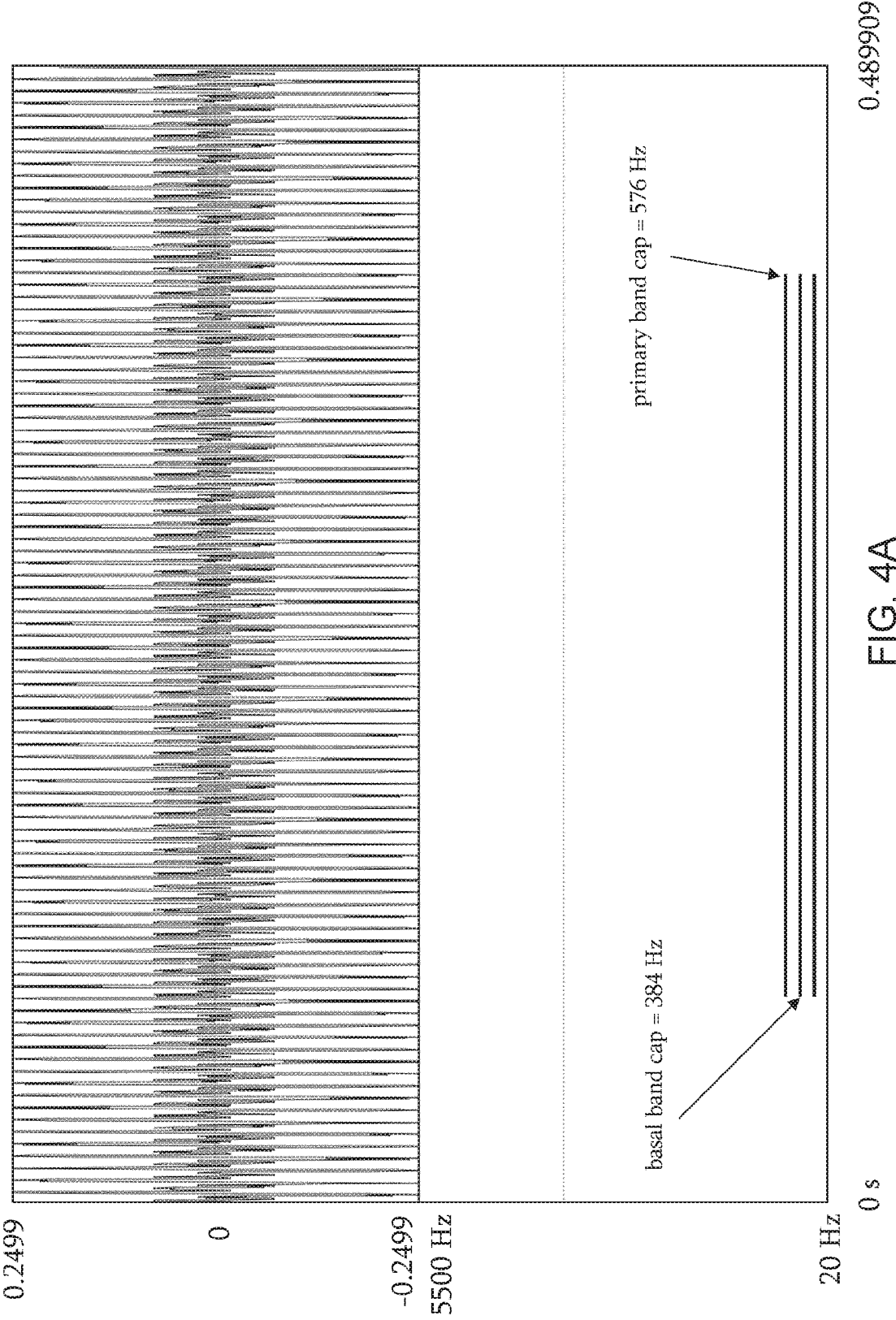
FIGS. 4A and 4B show example temporal waveforms and corresponding acoustic spectra for a one-note [u] phonetic chord. The waveform of FIG. 4A is synthesized using a fundamental frequency of 192 Hz; the waveform of FIG. 4B is recorded and exhibits an estimated fundamental frequency of 211.4 Hz.
Figure 4B:
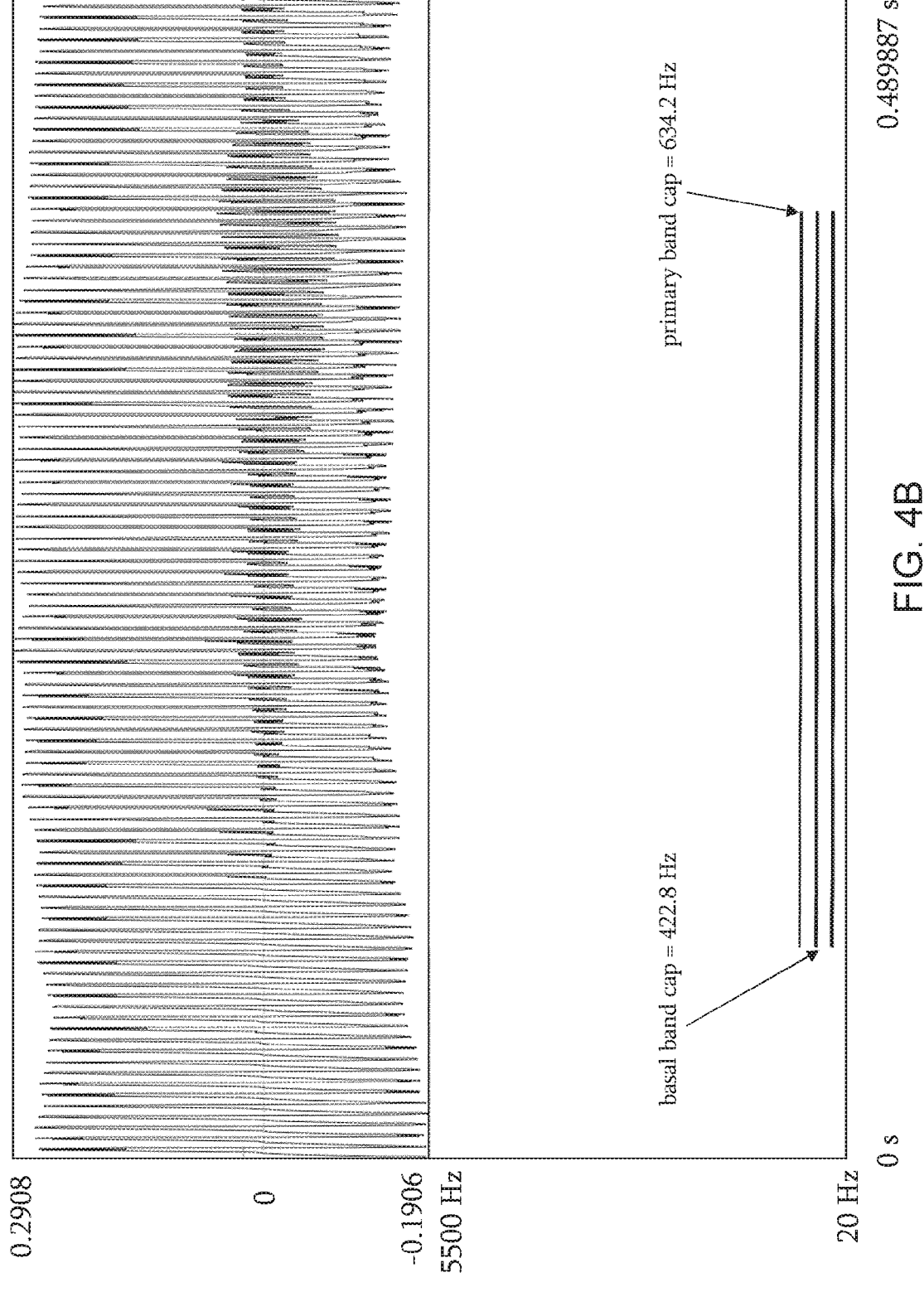
Figure 5:
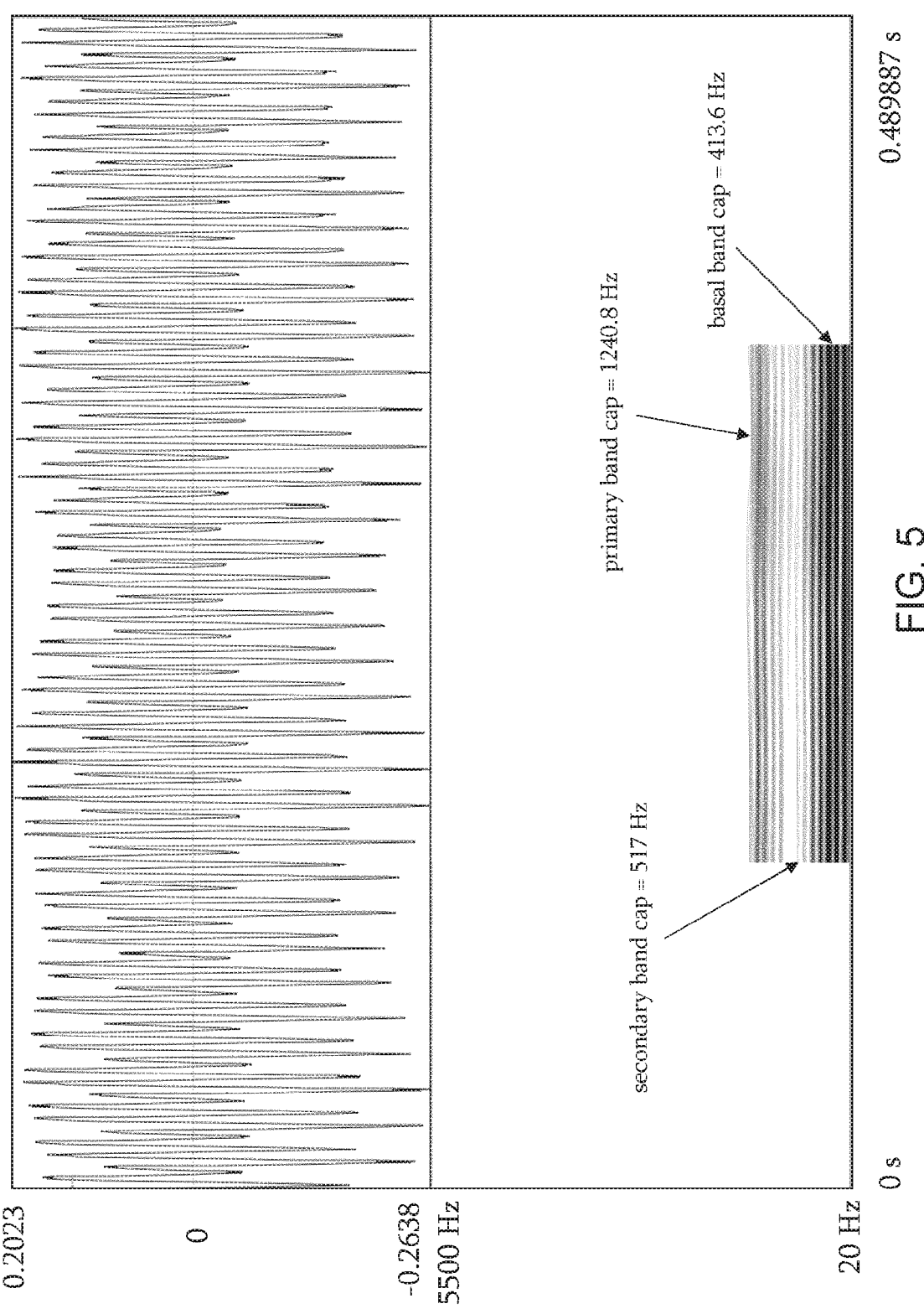
FIG. 5 shows example temporal waveform and corresponding acoustic spectrum for a recorded two-note [/\|u] phonetic chord exhibiting an estimated fundamental frequency of 103.4 Hz.
Figure 6A:
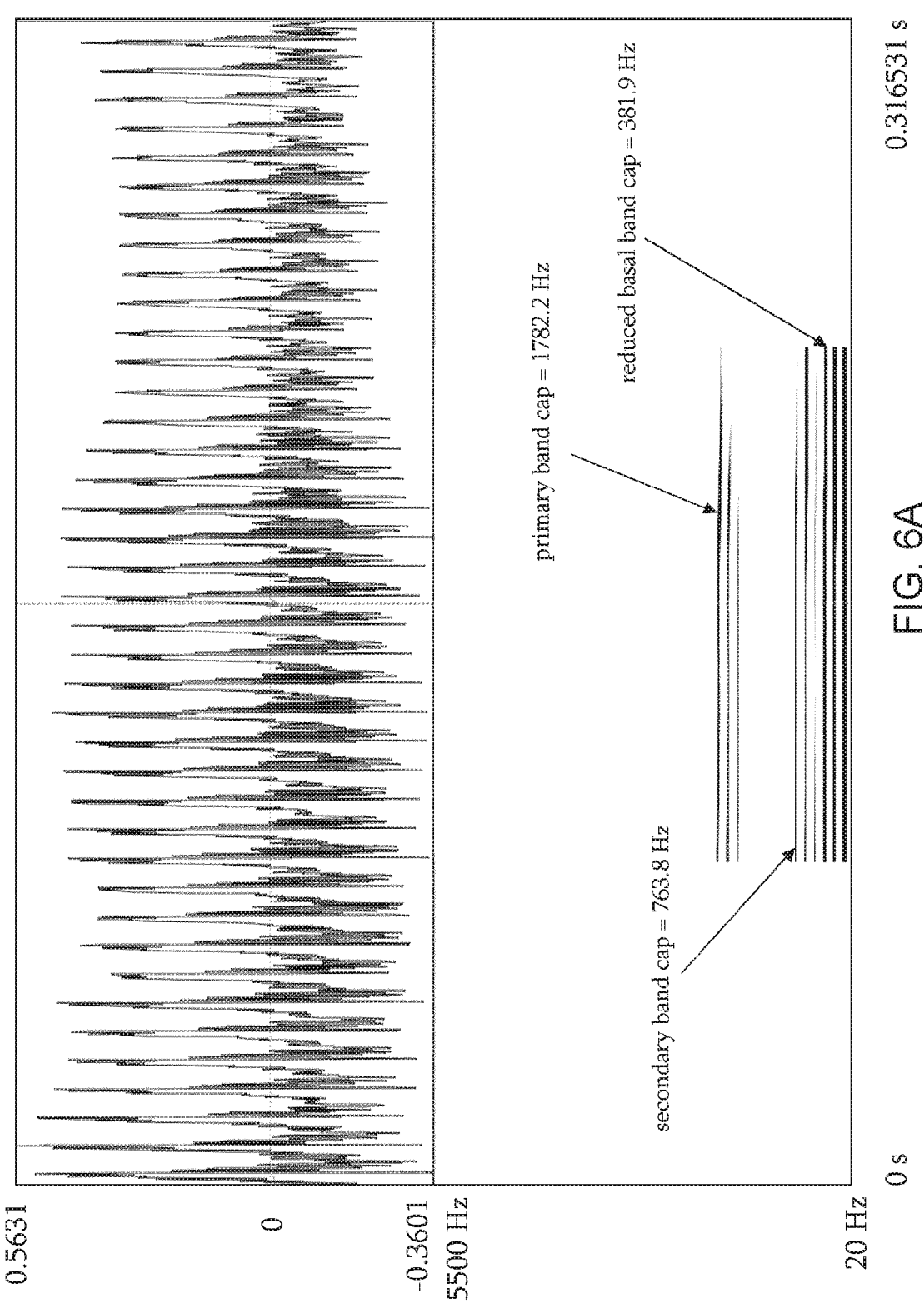
FIGS. 6A and 6B show example temporal waveforms and corresponding acoustic spectra for a three-note [ā|o] phonetic chord. The waveform of FIG. 6A is recorded and exhibits an estimated fundamental frequency of 127 Hz; the waveform of FIG. 6B is synthesized using a fundamental frequency of 127 Hz.
Figure 6B:
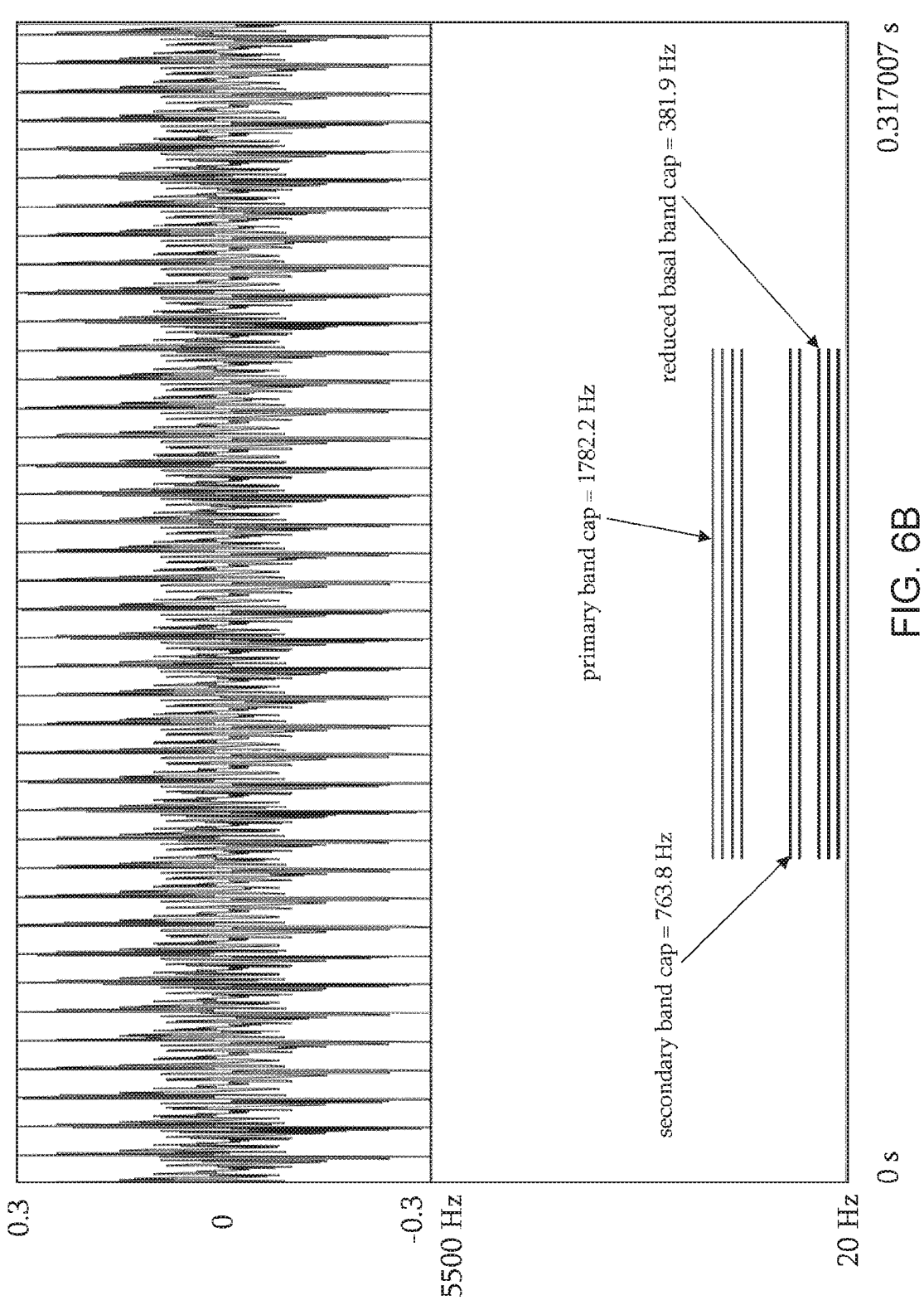
Figure 7:
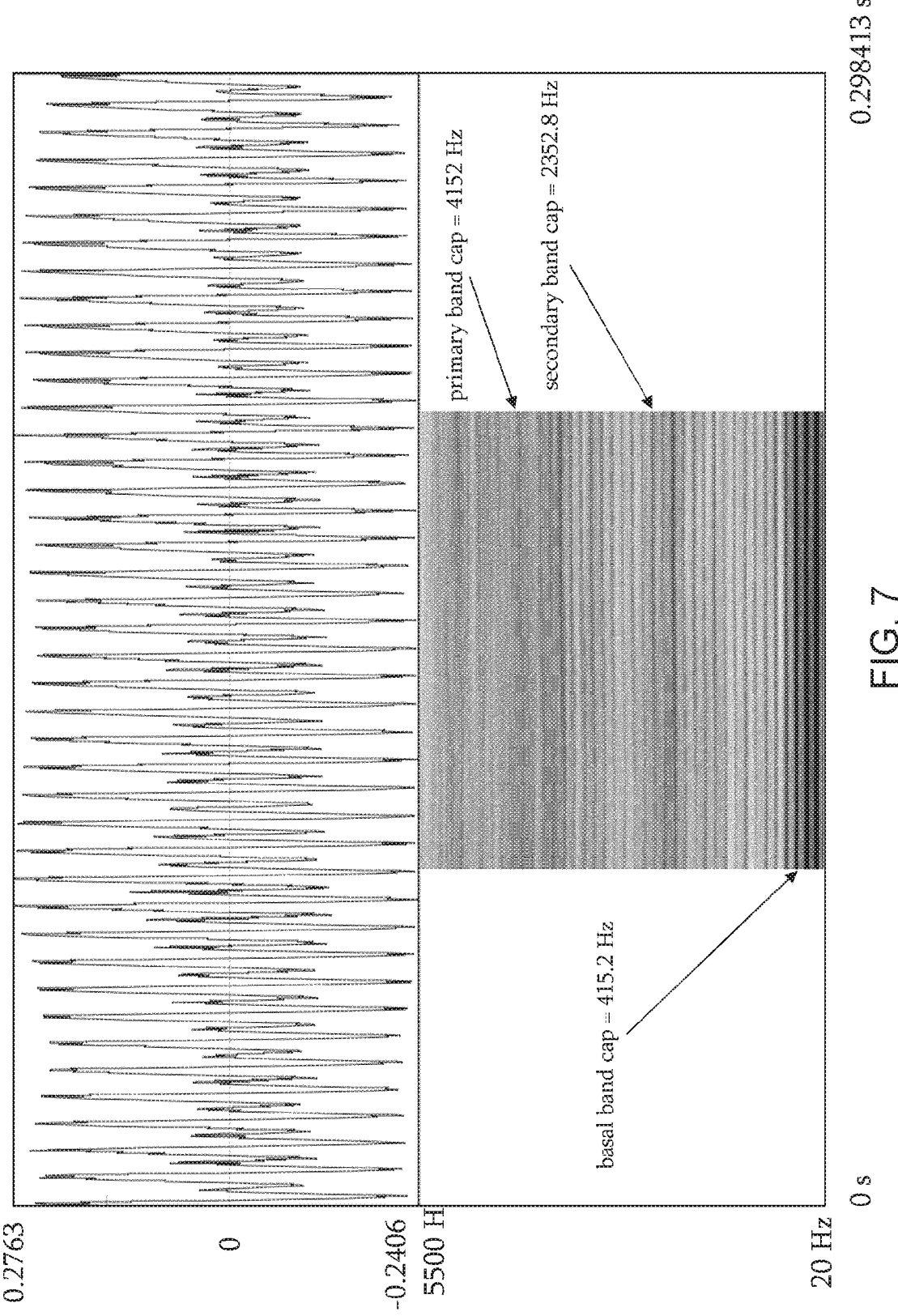
FIG. 7 shows example temporal waveform and corresponding acoustic spectrum for a recorded two-note [i|y] phonetic chord exhibiting an estimated fundamental frequency of 138.4 Hz.
Figure 8:
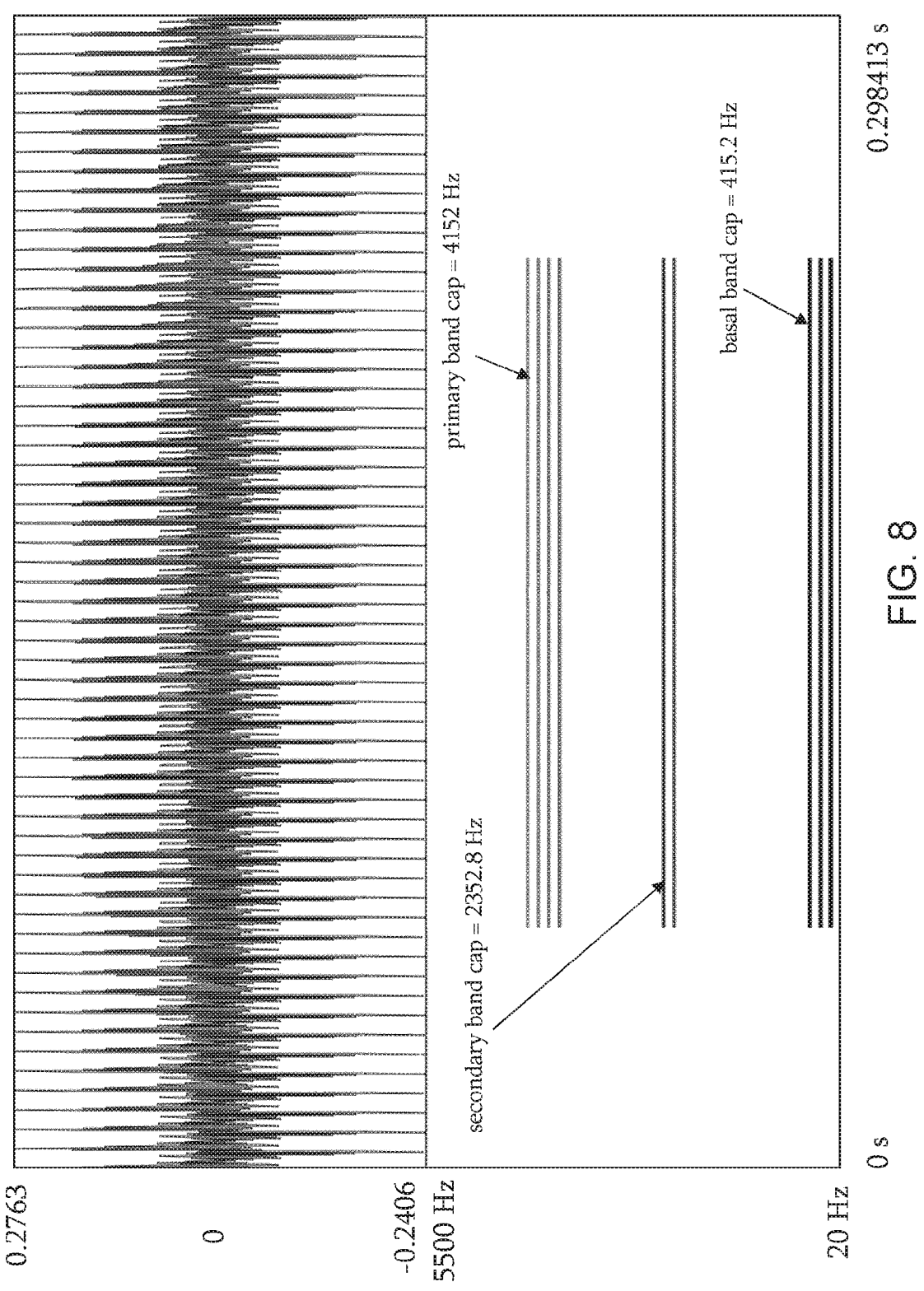
FIG. 8 shows example temporal waveform and corresponding acoustic spectrum for a two-note [i|y] phonetic chord synthesized using an estimated fundamental frequency of 138.4 Hz.

In some examples, a primary band of harmonic components can be identified in at least some harmonic spectra of the temporal sequence. The primary band can include harmonic components at the primary cap frequency and at the one, two, three, or more largest consecutive multiples of the fundamental acoustic frequency that are (i) less than the primary cap frequency, (ii) greater than 410 Hz, and (iii) greater than the smallest integer multiple of the fundamental acoustic frequency that is above 410 Hz. Stored data for the set of phonetic chords can include, in addition to the primary cap frequency, frequencies of those other harmonic components of the primary band. Based on a comparison of that primary band data with observed frequencies of a particular harmonic spectrum derived from the electronic waveform, a phonetic chord of the set can be selected as corresponding to that harmonic spectrum and the corresponding temporal portion of the waveform. FIGS. 4A/4B, 5, 6A/6B, 7, and 8 show a few examples of recorded and synthesized waveforms and harmonic spectra that could potentially be differentiated based on a primary band of harmonic components.

In some examples, a secondary band of harmonic components can be identified in at least some harmonic spectra of the temporal sequence. The secondary band can include harmonic components at one or more harmonic acoustic frequencies that are greater than the smallest integer multiple of the fundamental acoustic frequency that is above 410 Hz and separated from the primary cap frequency by at least one intervening multiple of the fundamental acoustic frequency for which the acoustic spectrum lacks a harmonic component. In other words, a secondary band falls below a "harmonic gap" or one or more "missing harmonics" between the lowest-frequency component of the primary band and the highest-frequency component of the secondary band. The frequency of the highest-frequency component of the secondary band can be referred to as the secondary cap frequency.

Stored data for the set of phonetic chords can include, in addition to the primary cap frequency (or a corresponding primary note), the secondary cap frequency (or a corresponding secondary note) and frequencies of one or more other harmonic components of the secondary band (if any). Based on a comparison of that secondary band data with observed frequencies of a particular harmonic spectrum derived from the electronic waveform, a phonetic chord of the set can be selected as corresponding to that harmonic spectrum and the corresponding temporal portion of the waveform. For example, observation of a secondary band can enable distinction between (i) a first phonetic chord having a secondary band separated from its primary band by one missing harmonic, and (ii) a second phonetic chord having a secondary band separated from its primary band by two or more missing harmonics. In some examples, comparison of secondary band data and observed components can be used in conjunction with comparison of primary band data and observed components; in other examples, secondary data and components can be used without also using primary band data and components. FIGS. 4A/4B, 5, 6A/6B, 7, and 8 show several examples of recorded and synthesized waveforms and harmonic spectra that could potentially be differentiated based on a secondary band of harmonic components.

In some examples, a basal band of harmonic components can be identified in at least some harmonic spectra of the temporal sequence. The basal band can include harmonic components at one or more fundamental or harmonic acoustic frequencies that are less than 410 Hz, and can also include a harmonic component at the smallest harmonic acoustic frequency above 410 Hz (unless that harmonic frequency is the primary cap frequency). The frequency of the highest-frequency component of the basal band can be referred to as the basal cap frequency. In examples wherein the primary cap frequency is also the only harmonic frequency above 410 Hz, the harmonic spectrum includes only the primary cap component and basal band components; there are no other primary band components and no secondary band components. Stored data for the set of phonetic chords can include, in addition to the primary cap frequency (or corresponding primary note), the basal cap frequency and frequencies of one or more other harmonic components of the basal band. Based on a comparison of that basal band data with observed frequencies of a particular harmonic spectrum derived from the electronic waveform, a phonetic chord of the set can be selected as corresponding to that harmonic spectrum and the corresponding temporal portion of the waveform.

In some examples, comparison of basal band data and observed components can be used in conjunction with comparison of primary band data and observed components; in other examples, basal band data and components can be used in conjunction with comparison of secondary band data and observed components; in other examples, basal band data and components can be used in conjunction with comparison of both primary and secondary band data and observed components; in other examples, basal data and components can be used without also using either primary or secondary band data and components. FIGS. 4A/4B, 5, 6A/6B, 7, and 8 show several examples of recorded and synthesized waveforms and harmonic spectra that could potentially be differentiated based on a basal band of harmonic components.

In some examples, a harmonic acoustic spectrum of the temporal sequence might include only basal band components with a cap frequency below 410 Hz. Such a harmonic acoustic spectrum is referred to as a reduced basal band, and it can correspond to certain harmonic acoustic schemata (e.g., nasals, nasalized vowels, or approximants) or hybrid acoustic schemata (e.g., voiced fricatives). Stored data for those acoustic schemata can include frequencies of harmonic components of the reduced basal band. Based on a comparison of that reduced basal band data with observed frequencies of a particular harmonic spectrum derived from the electronic waveform, a harmonic or hybrid acoustic schema of the set can be selected as corresponding to that harmonic spectrum and the corresponding temporal portion of the waveform. Presence or absence of higher-frequency inharmonic frequency components also can be employed to distinguish among (i) reduced-basal-band harmonic schemata (e.g., corresponding to the first row in FIG. 2) and (ii) hybrid schemata (e.g., voiced fricatives such as β, v, d, z, ⎰, $z_v$, ǰ, γ, ʁ, ς, ɦ).

Various methods disclosed herein for recognizing phonetic notes and chords within uttered human speech rely upon stored data indicative of harmonic spectra for each of multiple phonetic notes or chords, including harmonic frequencies expected for each phonetic note or chord (e.g., the tables of FIGS. 2, 3A, and 3B). Methods for generating that data for a set of phonetic notes and cords can include performing an acoustic spectral analysis on multiple utterances of phonetic chords by one or more human test subjects who are instructed to articulate certain specific sounds or words, with information being kept labeling the instructed utterances. Such a process is analogous to "teaching" the system to recognize each phonetic chord when it occurs within the waveform representing an utterance of human speech. In some examples, the harmonic spectral data can be generated based on utterances of a single human test subject, to train the system for recognition of speech from that particular subject. In other examples, the phone spectral data can be generated based on averages or other analyses of utterances of multiple human test subjects, to train the system for more general speech recognition.

For each phonetic note or chord, the spectral analysis includes estimation of a fundamental acoustic frequency and identification of two or more fundamental or harmonic components detected or identified in the spectrum. As described above, a component is "detected" or "identified" is one having an intensity that exceeds one or more suitably defined detection thresholds. Each component has an acoustic frequency that is the fundamental acoustic frequency or a harmonic acoustic frequency (i.e., an integer multiple of the fundamental acoustic frequency). The spectrum can be characterized by a fundamental acoustic frequency, although the spectrum may or may not include a fundamental component at that fundamental acoustic frequency. The highest harmonic acoustic frequency among the identified harmonic components that is also greater than 410 Hz is identified as the primary cap frequency, and that frequency is stored as part of the data for the phonetic chord. Also stored are acoustic frequencies for each identified fundamental or harmonic component, as described above. For some of the phonetic chords, the data can also include acoustic frequencies for identified harmonic components of one or more of a primary band, a secondary band, or a basal band, as described above.

To estimate a focal frequency for a phonetic note, multiple utterances of a subset of phonetic chords, at multiple different fundamental frequencies by one or more human test subjects, can be spectrally analyzed. The phonetic chords of the subset share the primary note. The focal frequency of the common primary note can be estimated from the primary cap frequencies of the uttered phonetic chords. The focal frequency can be estimated from the observed primary cap frequencies in a suitable way, e.g., mean or median of the observed primary cap frequencies.

For some harmonic acoustic schemata (e.g., nasals, nasalized vowels, or approximants) or hybrid acoustic schemata (e.g., voiced fricatives), the spectral analysis may identify fundamental or harmonic components only at frequencies below 410 Hz, described above as reduced basal band frequencies. Acoustic frequencies of those reduced basal band components can be included in the data set describing the corresponding harmonic or hybrid acoustic schemata, along with an indicator of absence or presence, respectively, of higher-frequency inharmonic components.

Recognition of the importance of harmonic components in the recognition of phonetic notes and chords in human-uttered speech also allows for improved speech synthesis. The spectral data described above used for recognition of phonetic chords can also be employed to produce or generate the sound of those chords. To synthesize a selected phonetic chord, a primary cap frequency can be determined based on a corresponding primary note and a selected fundamental frequency (i.e., pitch). For a harmonic phonetic chord, the primary cap frequency is (i) an integer multiple of the selected fundamental frequency, (ii) greater than 410 Hz, and (iii) closer to the focal frequency of the corresponding primary note than to focal frequencies of other phonetic notes. A frequency component at the primary cap frequency is included in a synthesized waveform segment. In some examples, if the selected phonetic chord includes a secondary note, a secondary cap frequency can be determined as described above for the primary note and cap frequency, and a frequency component at the secondary cap frequency can be included in the synthesized waveform segment.

The method can be repeated for each set of chords and fundamental frequencies among a temporal sequence of multiple different interspersed harmonic segments (e.g., vowels, nasalized vowels, nasals, and approximants) and hybrid segments (e.g., voiced fricatives). The synthesized harmonic segments, together with synthesized inharmonic segments (e.g., voiceless fricatives), synthesized silenced segments (e.g., occlusives, within trills, and within flaps), and the transitional segments between them, comprise a synthesized human utterance. The electronic waveform thus produced using the spectral data is applied to an electroacoustic transducer (e.g., a speaker) to produce the sound of the synthesized phonetic chord. A string of such chords can be produced to construct a synthesized speech sequence.

In some examples, to produce one of the phonetic chords for which spectral data are available, an electronic waveform corresponding to that chord is created using the corresponding spectral data (the primary cap frequency along with acoustic frequencies of harmonic components). For some phonetic notes and chords, the data can include acoustic frequencies for identified harmonic components of one or more of a primary band, a secondary band, or a basal band, as described above. For some harmonic or hybrid acoustic schemata (e.g., phonetic chords that lack primary and secondary component, such as nasals or voiced fricatives), the data can include reduced basal band components and an indicator of presence or absence of higher-frequency inharmonic components.

The systems and methods disclosed herein can be implemented as or with general or special purpose computers or servers or other programmable hardware devices programmed through software, or as hardware or equipment "programmed" through hard wiring, or a combination of the two. A "computer" or "server" can comprise a single machine or can comprise multiple interacting machines (located at a single location or at multiple remote locations). Computer programs or other software code, if used, can be implemented in tangible, non-transient, temporary or permanent storage or replaceable media, such as by including programming in microcode, machine code, network-based or web-based or distributed software modules that operate together, RAM, ROM, CD-ROM, CD-R, CD-R/W, DVD- ROM, DVD±R, DVD±R/W, hard drives, thumb drives, flash memory, optical media, magnetic media, semiconductor media, or any future computer-readable storage alternatives. Electronic indicia of a dataset can be read from, received from, or stored on any of the tangible, non-transitory computer-readable media mentioned herein.

In addition to the preceding, the following example embodiments fall within the scope of the present disclosure or appended claims:

Example 1. A computer-implemented method for identifying one or more phonetic chords represented within an electronic temporal waveform derived from an utterance of human speech, the method comprising: using one or more electronic processors of a programmed computer system: (a) for each of a plurality of harmonic acoustic spectra among a temporal sequence of acoustic spectra derived from the waveform, identifying within that harmonic acoustic spectrum two or more fundamental or harmonic components, each identified component having an intensity exceeding a detection threshold, and the identified components having frequencies that are separated by at least one integer multiple of a fundamental acoustic frequency associated with that acoustic spectrum; (b) for at least some of the plurality of acoustic spectra, identifying as a primary cap frequency a highest harmonic frequency among the identified harmonic components, which highest harmonic frequency is also greater than 410 Hz; and (c) for each of the plurality of acoustic spectra for which a primary cap frequency is identified in part (b), using the identified primary cap frequency to select as a primary phonetic note at least one phonetic note from among a set of phonetic notes, the selected primary phonetic note corresponding to a subset of phonetic chords from among a set of phonetic chords.

Example 2. The method of Example 1 wherein each of the acoustic spectra corresponds to one of a sequence of temporal sample intervals of the waveform, the method further comprising, using one or more of the electronic processors of the programmed computer system: (A) classifying at least some of the acoustic spectra among the temporal sequence as only one of harmonic, inharmonic, hybrid, or silenced; and (B) for at least some of the temporal sample intervals classified as harmonic in part (A), performing parts (a) through (c) and identifying the selected primary phonetic note as corresponding to that temporal sample interval of the electronic waveform.

Example 3. The method of Example 1 wherein each of the acoustic spectra corresponds to one of a sequence of distinct temporal segments during which a time-dependent acoustic spectrum of the waveform remains consistent with a single phonetic chord, the method further comprising, using one or more of the electronic processors of the programmed computer system: (A) classifying at least some of the temporal segments as only one of harmonic, inharmonic, or hybrid based on the acoustic spectrum thereof; and (B) for at least some of the temporal segments classified as harmonic in part (A), performing parts (a) through (c) and identifying the selected primary phonetic note as corresponding to that temporal segment of the electronic waveform.

Example 4. The method of any of Examples 1 through 3 further comprising, using one or more of the electronic processors of the programmed computer system, deriving from the electronic temporal waveform the temporal sequence of acoustic spectra.

Example 5. The method of any of Examples 1 through 4 wherein, for two or more different fundamental or harmonic components, the respective detection thresholds differ from one another according to acoustic frequency.

Example 6. The method of any of Examples 1 through 5 further comprising, using one or more of the electronic processors of the programmed computer system, for at least one of the harmonic acoustic spectra among a temporal sequence of acoustic spectra derived from the waveform, identifying within the harmonic acoustic spectrum a fundamental component having the fundamental acoustic frequency and an intensity that exceeds a detection threshold.

Example 7. The method of any of Examples 1 through 6 further comprising, using one or more of the electronic processors of the programmed computer system, selecting, for a particular harmonic acoustic spectrum of the plurality of acoustic spectra, a phonetic chord from among the subset of phonetic chords of part (c), based at least in part on a comparison of (i) stored data, indicative of harmonic frequencies expected for the phonetic chords of the subset, with (ii) harmonic frequencies of harmonic components of a primary band of the harmonic acoustic spectrum, the primary band including harmonic components at the primary cap frequency and at one, two, or three largest consecutive multiples of the fundamental acoustic frequency that are less than the primary cap frequency, greater than 410 Hz, and greater than the smallest integer multiple of the fundamental acoustic frequency that is above 410 Hz and less than the primary cap frequency.

Example 8. The method of any of Examples 1 through 7 further comprising, using one or more of the electronic processors of the programmed computer system, selecting, for a particular harmonic acoustic spectrum of the plurality of acoustic spectra, a phonetic chord from among the subset of part (c), based at least in part on a comparison of (i) stored data, indicative of harmonic frequencies expected for the phonetic chords of the set, with (ii) harmonic frequencies of harmonic components of a secondary band of the harmonic acoustic spectrum, the secondary band including harmonic components at one or more harmonic acoustic frequencies that are greater than the smallest integer multiple of the fundamental acoustic frequency that is above 410 Hz and separated from the primary cap frequency by at least one intervening multiple of the fundamental acoustic frequency for which the acoustic spectrum lacks a harmonic component.

Example 9. The method of any of Examples 1 through 8 further comprising, using one or more of the electronic processors of the programmed computer system, making the selection of part (c) for a particular harmonic acoustic spectrum of the plurality of acoustic spectra based at least in part on a comparison of (i) stored data, indicative of harmonic frequencies expected for the phonetic chords of the set, with (ii) harmonic frequencies of harmonic components of a basal band of the harmonic acoustic spectrum, the basal band including harmonic components at one or more fundamental or harmonic acoustic frequencies that are less than 410 Hz or equal to the smallest integer multiple of the fundamental acoustic frequency that is between 410 Hz and the primary cap frequency.

Example 10. The method of any of Examples 1 through 9 further comprising, for a selected harmonic acoustic spectrum for which the highest harmonic acoustic frequency of an identified harmonic component is less than 410 Hz, using one or more of the electronic processors of the programmed computer system, selecting from among a set of harmonic or hybrid acoustic schemata one of those schemata based at least in part on (i) a comparison of (A) stored data, indicative of harmonic frequencies expected for the acoustic schemata of the set, with (B) harmonic frequencies of each identified fundamental or harmonic component, and (ii) presence or absence of higher-frequency inharmonic frequency components.

Example 11. A computer-implemented method for generating stored data indicative of harmonic frequencies expected for respective harmonic acoustic spectra of phonetic chords of a set of phonetic chords, the method comprising: using one or more of the electronic processors of a programmed computer system: (a) for each phonetic chord of the set, spectrally analyzing multiple electronic waveforms derived from respective utterances of that phonetic chord by one or more human test subjects, the spectral analysis including, for each electronic waveform, estimation of a fundamental acoustic frequency and identification of two or more fundamental or harmonic components each having an intensity that exceeds a detection threshold and an acoustic frequency that is the fundamental acoustic frequency or a harmonic acoustic frequency that is equal to an integer multiple of the fundamental acoustic frequency; (b) identifying as a primary cap frequency the highest harmonic acoustic frequency among the identified harmonic components that is also greater than 410 Hz, and for each phonetic chord for which a primary cap frequency is thus identified, storing, on a tangible, non-transitory computer-readable storage medium that is not a transitory propagating signal, electronic indicia of the primary cap frequency, and acoustic frequencies for each identified fundamental or harmonic component.

Example 12. The method of Example 11 further comprising, for a subset of the phonetic chords having a common primary phonetic note, and for multiple utterances at multiple different fundamental frequencies by one or more human test subjects, (i) estimating from the primary cap frequencies a focal frequency for the common primary phonetic note that corresponds to the subset of phonetic chords, and (ii) storing, on a tangible, non-transitory computer-readable storage medium that is not a transitory propagating signal, electronic indicia of the focal frequency of the primary phonetic note.

Example 13. The method of any of Examples 11 or 12 wherein the detection threshold varies as a function of acoustic frequency.

Example 14. The method of any of Examples 11 through 13 wherein the stored data include, for at least some of the phonetic chords of the set, harmonic frequencies of harmonic components of a primary band of a corresponding harmonic acoustic spectrum, the primary band including harmonic components at the primary cap frequency and at one, two, three, or more largest consecutive multiples of the fundamental acoustic frequency that are (i) less than the primary cap frequency, (ii) greater than 410 Hz, and (iii) greater than the smallest integer multiple of the fundamental acoustic frequency that is above 410 Hz and less than the primary cap frequency.

Example 15. The method of any of Examples 11 through 14 wherein the stored data include, for at least some of the phonetic chords of the set, harmonic frequencies of harmonic components of a secondary band of a corresponding harmonic acoustic spectrum, the secondary band including one or more harmonic components at harmonic acoustic frequencies that are greater than the smallest integer multiple of the fundamental acoustic frequency that is above 410 Hz and separated from the primary cap frequency by at least one intervening multiple of the fundamental acoustic frequency for which the acoustic spectrum lacks a harmonic component.

Example 16. The method of any of Examples 11 through 15 wherein the stored data include, for at least some of the phonetic chords of the set, harmonic frequencies of harmonic components of a basal band of a corresponding harmonic acoustic spectrum, the basal band including one or more harmonic components at one or more fundamental or harmonic acoustic frequencies that are less than 410 Hz or equal to the smallest integer multiple of the fundamental acoustic frequency that is between 410 Hz and the primary cap frequency.

Example 17. The method of any of Examples 11 through 16 further comprising: (a) for each one of an additional set of harmonic, or hybrid acoustic schemata, spectrally analyzing multiple electronic waveforms derived from respective utterances of that schemata by one or more human test subjects, the spectral analysis including, for each electronic waveform, estimation of a fundamental acoustic frequency and identification of two or more fundamental or harmonic components each having an intensity that exceeds a detection threshold and an acoustic frequency that is the fundamental acoustic frequency or a harmonic acoustic frequency that is equal to an integer multiple of the fundamental acoustic frequency, each of the fundamental and harmonic acoustic frequencies being less than 410 Hz; and (b) for each acoustic schema for which multiple waveforms are analyzed in part (a), storing, on a tangible, non-transitory computer-readable storage medium that is not a transitory propagating signal, electronic indicia of the one or more fundamental and harmonic acoustic frequencies for each identified fundamental or harmonic component, and presence or absence of higher-frequency inharmonic components.

Example 18. A computer-implemented method for synthesizing a temporal segment of an electronic waveform that, when the waveform segment is applied to an electroacoustic transducer, produces sound of a phonetic chord selected from among a set of phonetic chords, the method comprising: using one or more of the electronic processors of a programmed computer system: (a) using received, retrieved, or calculated data indicative of a primary phonetic note corresponding to the selected phonetic chord and a focal frequency of that primary phonetic note, determining a primary cap frequency using the focal frequency and a selected fundamental acoustic frequency, the primary cap frequency being (i) an integer multiple of the selected fundamental frequency, (ii) greater than 410 Hz, and (iii) closer to the focal frequency of the corresponding primary note than to focal frequencies of other phonetic notes; and (b) including in the waveform segment a harmonic component at the primary cap frequency, the primary cap frequency being greater than acoustic frequencies of all other harmonic components included in the waveform segment.

Example 19. The method of Example 18 further comprising repeating the method of Example 18 for each phonetic chord among a temporal sequence of multiple different harmonic or hybrid segments, along with inharmonic or silenced segments, and transitional segments therebetween, that together comprise a human utterance.

Example 20. The method of any of Examples 18 or 19 further comprising applying to an electroacoustic transducer the waveform segment to produce sound of the selected phonetic chord.

Example 21. The method of any of Examples 18 through 20 further comprising, for one or more of the phonetic chords of the set, including in the waveform segment harmonic components of a primary band, the primary band including harmonic components at the primary cap frequency and at one, two, three, or more largest consecutive multiples of the fundamental acoustic frequency that are (i) less than the primary cap frequency, (ii) greater than 410 Hz, and (iii) greater than the smallest integer multiple of the fundamental acoustic frequency that is above 410 Hz and less than the primary cap frequency.

Example 22. The method of any of Examples 18 through 20 further comprising, for one or more of the phonetic chords of the set, including in the waveform segment harmonic components of a primary band, the primary band including harmonic components at the primary cap frequency and at least three largest consecutive multiples of the fundamental acoustic frequency that are (i) less than the primary cap frequency, (ii) greater than 410 Hz, and (iii) greater than the smallest integer multiple of the fundamental acoustic frequency that is above 410 Hz and less than the primary cap frequency.

Example 23. The method of any of Examples 18 through 22 further comprising, for one or more of the phonetic chords of the set: (a) using received, retrieved, or calculated data indicative of a secondary phonetic note corresponding to the selected phonetic chord and a focal frequency of that secondary phonetic note, determining a secondary cap frequency using the focal frequency and the selected fundamental acoustic frequency, the secondary cap frequency being (i) an integer multiple of the selected fundamental frequency, (ii) greater than 410 Hz, and (iii) closer to the focal frequency of the corresponding secondary note than to focal frequencies of other phonetic notes; and (b) including in the waveform segment one or more harmonic components of a secondary band, the secondary band including harmonic components at harmonic acoustic frequencies that are (i) greater than the smallest integer multiple of the fundamental acoustic frequency that is above 410 Hz and (ii) less than or equal to the secondary cap frequency.

Example 24. The method of any of Examples 18 through 23 further comprising, for one or more of the phonetic chords of the set, including in the waveform segment one or more harmonic components of a basal band, the basal band including harmonic components at one or more fundamental or harmonic acoustic frequencies that are (i) less than 410 Hz or (ii) equal to the smallest integer multiple of the fundamental acoustic frequency that is between 410 Hz and the primary cap frequency.

Example 25. The method of any of Examples 18 through 24 further comprising, for at least one additional temporal segment of the electronic waveform corresponding to a selected harmonic or hybrid acoustic schema of a set of such acoustic schemata, including in the additional waveform segment one or more harmonic components of only a reduced basal band, the reduced basal band including only harmonic components at one or more fundamental or harmonic acoustic frequencies that are less than 410 Hz.

Example 26. The method of any of Examples 18 through 25 further comprising, for at least one additional temporal segment of the electronic waveform corresponding to a selected harmonic or hybrid acoustic schema of a set of such acoustic schemata, including in the additional waveform segment (i) one or more harmonic components of only a reduced basal band, the reduced basal band including only harmonic components at one or more fundamental or harmonic acoustic frequencies that are less than 410 Hz, and (ii) one or more higher-frequency inharmonic components.

Example 27. A programmed computerized machine comprising one or more electronic processors and one or more tangible computer-readable storage media operationally coupled to the one or more processors, the machine being structured and programmed to perform the method of any of Examples 1 through 26.

Example 28. An article comprising a tangible medium that is not a transitory propagating signal, the medium encoding computer-readable instructions that, when applied to a computer system, instruct the computer system to perform the method of any of Examples 1 through 26.

This disclosure is illustrative and not limiting. Further modifications will be apparent to one skilled in the art in light of this disclosure and are intended to fall within the scope of the present disclosure. It is intended that equivalents of the disclosed example embodiments and methods, or modifications thereof, shall fall within the scope of the present disclosure.

In the foregoing Detailed Description, various features may be grouped together in several example embodiments for the purpose of streamlining the disclosure. This method of disclosure is not to be interpreted as reflecting an intention that any identified embodiment requires more features than are expressly recited therein. Rather, inventive subject matter may lie in less than all features of a single disclosed example embodiment. Therefore, the present disclosure shall be construed as implicitly disclosing any embodiment having any suitable subset of one or more features-which features are shown, described, or specified in the present application-including those subsets that may not be explicitly disclosed herein. A "suitable" subset of features includes only features that are neither incompatible nor mutually exclusive with respect to any other feature of that subset. It should be further noted that the cumulative scope of the examples listed above can, but does not necessarily, encompass the whole of the subject matter disclosed in the present application.

The following interpretations shall apply for purposes of the present disclosure. The words "comprising," "including," "having," and variants thereof, wherever they appear, shall be construed as open-ended terminology, with the same meaning as if a phrase such as "at least" were appended after each instance thereof, unless explicitly stated otherwise. The article "a" shall be interpreted as "one or more," unless "only one," "a single," or other similar limitation is stated explicitly or is implicit in the particular context; similarly, the article "the" shall be interpreted as "one or more of the," unless "only one of the," "a single one of the," or other similar limitation is stated explicitly or is implicit in the particular context. The conjunction "or" is to be construed inclusively unless: (i) it is explicitly stated otherwise, e.g., by use of "either . . . or," "only one of," or similar language; or (ii) two or more of the listed alternatives are understood or disclosed (implicitly or explicitly) to be incompatible or mutually exclusive within the particular context. In that latter case, "or" would be understood to encompass only those combinations involving non-mutually-exclusive alternatives. In one example, each of "a dog or a cat," "one or more of a dog or a cat," and "one or more dogs or cats" would be interpreted as one or more dogs without any cats, or one or more cats without any dogs, or one or more of each. In another example, each of "a dog, a cat, or a mouse," "one or more of a dog, a cat, or a mouse," and "one or more dogs, cats, or mice" would be interpreted as (i) one or more dogs without any cats or mice, (ii) one or more cats without and dogs or mice, (iii) one or more mice without any dogs or cats, (iv) one or more dogs and one or more cats without any mice, (v) one or more dogs and one or more mice without any cats, (vi) one or more cats and one or more mice without any dogs, or (vii) one or more dogs, one or more cats, and one or more mice. In another example, each of "two or more of a dog, a cat, or a mouse" or "two or more dogs, cats, or mice" would be interpreted as (i) one or more dogs and one or more cats without any mice, (ii) one or more dogs and one or more mice without any cats, (iii) one or more cats and one or more mice without and dogs, or (iv) one or more dogs, one or more cats, and one or more mice; "three or more," "four or more," and so on would be analogously interpreted.

For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure, any labelling of elements, steps, limitations, or other portions of an embodiment or example (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment or example, or, in some instances, it will be implicit or inherent based on the specific content of the embodiment or example. If the provisions of 35 USC § 112 (f) or any corresponding law related to "means plus function" or "step plus function" claim format are desired to be invoked in a description of an apparatus, then the word "means" will appear in that description. If those provisions are desired to be invoked in a description of a method, the words "a step for" will appear in that description. Conversely, if the words "means" or "a step for" do not appear, then such provisions are not intended to be invoked.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as an aid to those searching for specific subject matter within the patent literature. However, the Abstract is not intended to imply that any elements, features, or limitations recited therein are necessarily encompassed by any particular description or are in any way required.

What is claimed is:

1. A computer-implemented method for recognizing audible human speech represented by an electronic temporal waveform derived from an utterance of that audible human speech, the method comprising, in a computer system programmed to perform speech recognition:

using one or more electronic processors of the computer system:

(a) for each of a plurality of harmonic acoustic spectra among a temporal sequence of acoustic spectra derived from the electronic temporal waveform, identifying within that harmonic acoustic spectrum two or more fundamental or harmonic components, each identified component having an intensity exceeding a detection threshold, and the identified components having frequencies that are separated by at least one integer multiple of a fundamental acoustic frequency associated with that acoustic spectrum, wherein the detection threshold comprises (i) a selected level; (ii) a frequency-dependent level that differs among the identified components; or (iii) a level that varies as a function of acoustic frequency;

(b) for at least some of the plurality of harmonic acoustic spectra, identifying as a primary cap frequency a highest harmonic frequency among the identified components, which highest harmonic frequency is also greater than 410 Hz;

(c) for each of the harmonic acoustic spectra for which a primary cap frequency is identified in part (b), using the identified primary cap frequency to select as a primary phonetic note at least one phonetic note from among a set of phonetic notes, the selected primary phonetic note corresponding to a subset of phonetic chords from among a set of phonetic chords, wherein each of the phonetic notes correspond to a basic harmonic element and each of the phonetic chords includes one or more phonetic notes; and (d) for each of the harmonic acoustic spectra of part (c) for which the subset of phonetic chords comprises more than one phonetic chord:

(i) identifying as a secondary cap frequency a highest harmonic frequency among the identified components within a secondary band of the harmonic acoustic spectrum, wherein the secondary band includes harmonic components at one or more harmonic acoustic frequencies that are greater than the smallest integer multiple of the fundamental acoustic frequency that is above 410 Hz and separated from the primary cap frequency by at least one intervening multiple of the fundamental acoustic frequency for which the acoustic spectrum lacks a harmonic component, and (ii) using the identified secondary cap frequency to select one of the phonetic chords from among the subset of phonetic chords of part (c).

2. The method of claim 1 wherein each of the acoustic spectra corresponds to one of a sequence of temporal sample intervals of the electronic temporal waveform, the method further comprising, using one or more of the electronic processors of the computer system:

(A) classifying at least some of the acoustic spectra among the temporal sequence as only one of harmonic, inharmonic, hybrid, or silenced; and (B) for at least some of the temporal sample intervals classified as harmonic in part (A), performing parts (a) through (d).

3. The method of claim 1 wherein each of the acoustic spectra corresponds to one of a sequence of distinct temporal segments during which a time-dependent acoustic spectrum of the electronic temporal waveform remains consistent with a single phonetic chord, the method further comprising, using one or more of the electronic processors of the computer system:

(A) classifying at least some of the temporal segments as only one of harmonic, inharmonic, or hybrid based on the acoustic spectrum thereof; and (B) for at least some of the temporal segments classified as harmonic in part (A), performing parts (a) through (d).

4. The method of claim 1 further comprising, using one or more of the electronic processors of the computer system, deriving from the electronic temporal waveform the temporal sequence of acoustic spectra.

5. The method of claim 1 wherein, for the two or more different fundamental or harmonic components, the detection threshold differs according to acoustic frequency.

6. The method of claim 1 further comprising, using one or more of the electronic processors of the computer system, for at least one of the harmonic acoustic spectra among a temporal sequence of acoustic spectra derived from the electronic temporal waveform, identifying within the harmonic acoustic spectrum a fundamental component having the fundamental acoustic frequency and an intensity that exceeds the detection threshold.

7. The method of claim 1 further comprising, using one or more of the electronic processors of the computer system, selecting, for a particular harmonic acoustic spectrum of the plurality of harmonic acoustic spectra, a phonetic chord from among the subset of phonetic chords of part (c), further based on a comparison of (i) stored data indicative of harmonic frequencies expected for the phonetic chords of the subset, with (ii) harmonic frequencies of harmonic components of a primary band of the harmonic acoustic spectrum, the primary band including harmonic components at the primary cap frequency and at one, two, or three largest consecutive multiples of the fundamental acoustic frequency that are less than the primary cap frequency, greater than 410 Hz, and greater than the smallest integer multiple of the fundamental acoustic frequency that is above 410 Hz and less than the primary cap frequency.

8. The method of claim 1 further comprising, using one or more of the electronic processors of the computer system making the selection of part (c) for a particular harmonic acoustic spectrum of the plurality of harmonic acoustic spectra based on a comparison of (i) stored data indicative of harmonic frequencies expected for the phonetic chords of the set of phonetic chords, with (ii) harmonic frequencies of harmonic components of a basal band of the harmonic acoustic spectrum, the basal band including harmonic components at one or more fundamental or harmonic acoustic frequencies that are less than 410 Hz or equal to the smallest integer multiple of the fundamental acoustic frequency that is between 410 Hz and the primary cap frequency.

9. The method of claim 1 further comprising, for a selected harmonic acoustic spectrum for which the highest harmonic acoustic frequency of an identified harmonic component is less than 410 Hz, using one or more of the electronic processors of the computer system, selecting from among a set of harmonic or hybrid acoustic schemata one of those schemata based on (i) a comparison of (A) stored data indicative of harmonic frequencies expected for the acoustic schemata of the set of harmonic or hybrid acoustic schemata, with (B) harmonic frequencies of each identified fundamental or harmonic component, and (ii) presence or absence of inharmonic frequency components.

10. The method of claim 1 wherein the primary phonetic note is selected based on stored data indicative of harmonic frequencies expected for respective harmonic acoustic spectra of the phonetic chords of the set of phonetic chords, the stored data being generated by a method comprising:

using one or more of the electronic processors of the computer system:

(A) for each phonetic chord of the set of phonetic chords, spectrally analyzing multiple electronic waveforms derived from respective utterances of that phonetic chord by one or more human test subjects, the spectral analysis including, for each electronic waveform, estimation of a fundamental acoustic frequency and identification of two or more fundamental or harmonic components each having an intensity that exceeds the detection threshold and an acoustic frequency that is the fundamental acoustic frequency or a harmonic acoustic frequency that is equal to an integer multiple of the fundamental acoustic frequency; and (B) for each phonetic chord of the set of phonetic chords, identifying, as an expected primary cap frequency of the stored data indicative of harmonic frequencies expected for respective harmonic acoustic spectra, a highest harmonic acoustic frequency among the identified components of part (A) that is also greater than 410 Hz, and storing, on a computer-readable storage medium, electronic indicia of the expected primary cap frequency for each phonetic chord of the set of phonetic chords.

11. The method of claim 10 wherein stored data is generated by a method further comprising, for a subset of the phonetic chords having a common primary phonetic note, using the spectrally analyzed multiple electronic waveforms derived from multiple utterances at multiple different fundamental frequencies by the one or more human test subjects, (i) for each phonetic chord of the subset of the phonetic chords, identifying, as an expected secondary cap frequency of the stored data indicative of harmonic frequencies expected for respective harmonic acoustic spectra, a highest harmonic frequency among the identified components of part (A) that is separated from the expected primary cap frequency for the respective phonetic chord by at least one intervening multiple of the fundamental acoustic frequency for which the acoustic spectrum lacks a harmonic component, and (ii) storing, on a computer-readable storage medium, electronic indicia of the expected secondary cap frequency for each phonetic chord of the subset of phonetic chords.

12. The method of claim 11 wherein the detection threshold varies as a function of acoustic frequency.

13. The method of claim 11 wherein the stored data include, for at least some of the phonetic chords of the set of phonetic chords, harmonic frequencies of harmonic components, and where the harmonic components are components of one of the following:

(A) a primary band of a corresponding harmonic acoustic spectrum, the primary band including harmonic components at the primary cap frequency and at one, two, three, or more largest consecutive multiples of the fundamental acoustic frequency that are (i) less than the primary cap frequency, (ii) greater than 410 Hz, and (iii) greater than the smallest integer multiple of the fundamental acoustic frequency that is above 410 Hz and less than the primary cap frequency;

(B) a secondary band of a corresponding harmonic acoustic spectrum, the secondary band including one or more harmonic components at harmonic acoustic frequencies that are greater than the smallest integer multiple of the fundamental acoustic frequency that is above 410 Hz and separated from the primary cap frequency by at least one intervening multiple of the fundamental acoustic frequency for which the acoustic spectrum lacks a harmonic component; or (C) a basal band of a corresponding harmonic acoustic spectrum, the basal band including one or more harmonic components at one or more fundamental or harmonic acoustic frequencies that are less than 410 Hz or equal to the smallest integer multiple of the fundamental acoustic frequency that is between 410 Hz and the primary cap frequency.

14. The method of claim 11 further comprising:

(a) for each one of an additional set of harmonic or hybrid acoustic schemata, spectrally analyzing multiple electronic waveforms derived from respective utterances of that schemata by one or more human test subjects, the spectral analysis including, for each electronic waveform, estimation of a fundamental acoustic frequency and identification of two or more fundamental or harmonic components each having an intensity that exceeds the detection threshold and an acoustic frequency that is the fundamental acoustic frequency or a harmonic acoustic frequency that is equal to an integer multiple of the fundamental acoustic frequency, each of the fundamental and harmonic acoustic frequencies being less than 410 Hz; and (b) for each acoustic schema for which multiple electronic waveforms are analyzed in part (a), storing, on a computer-readable storage medium, electronic indicia of the fundamental and harmonic acoustic frequencies for each identified fundamental or harmonic component, and presence or absence of inharmonic components.

15. The method of claim 1 wherein the detection threshold comprises a frequency-dependent level that differs among the identified components.

16. A computerized machine comprising:

one or more electronic processors and one or more computer-readable storage media coupled to the one or more processors, the machine being structured and programmed to perform a method for recognizing audible human speech represented by an electronic temporal waveform derived from an utterance of that audible human speech using one or more of the electronic processors, the method comprising:

(a) for each of a plurality of harmonic acoustic spectra among a temporal sequence of acoustic spectra derived from the electronic temporal waveform, identifying within that harmonic acoustic spectrum two or more fundamental or harmonic components, each identified component having an intensity exceeding a detection threshold, and the identified components having frequencies that are separated by at least one integer multiple of a fundamental acoustic frequency associated with that acoustic spectrum, wherein the detection threshold comprises (i) a selected level; (ii) a frequency-dependent level that differs among the identified components; or (iii) a level that varies as a function of acoustic frequency;

(b) for at least some of the plurality of harmonic acoustic spectra, identifying as a primary cap frequency a highest harmonic frequency among the identified components, which highest harmonic frequency is also greater than 410 Hz;

(c) for each of the harmonic acoustic spectra for which a primary cap frequency is identified in part (b), using the identified primary cap frequency to select as a primary phonetic note at least one phonetic note from among a set of phonetic notes, the selected primary phonetic note corresponding to a subset of phonetic chords from among a set of phonetic chords, wherein each of the phonetic notes correspond to a basic harmonic element and each of the phonetic chords includes one or more phonetic notes; and (d) for each of the harmonic acoustic spectra of part (c) for which the subset of phonetic chords comprises more than one phonetic chord:

(i) identifying as a secondary cap frequency a highest harmonic frequency among the identified components within a secondary band of the harmonic acoustic spectrum, wherein the secondary band includes harmonic components at one or more harmonic acoustic frequencies that are greater than the smallest integer multiple of the fundamental acoustic frequency that is above 410 Hz and separated from the primary cap frequency by at least one intervening multiple of the fundamental acoustic frequency for which the acoustic spectrum lacks a harmonic component, and (ii) using the identified secondary cap frequency to select one of the phonetic chords from among the subset of phonetic chords of part (c).

17. The computerized machine of claim 16 wherein each of the acoustic spectra corresponds to one of a sequence of temporal sample intervals of the electronic temporal waveform, and wherein the method that the machine is structured and programmed to perform further comprises:

(A) deriving from the electronic temporal waveform the temporal sequence of acoustic spectra;

(B) classifying at least some of the acoustic spectra among the temporal sequence derived from the electronic temporal waveform as only one of harmonic, inharmonic, hybrid, or silenced;

(C) for at least one of the acoustic spectra classified in part (B) as harmonic, identifying within the harmonic acoustic spectrum a fundamental component having the fundamental acoustic frequency and an intensity that exceeds the detection threshold; and (D) for at least the acoustic spectra identified in part (C), performing parts (a) through (d).

18. The computerized machine of claim 16 wherein the primary phonetic note is selected based on stored data indicative of harmonic frequencies expected for respective harmonic acoustic spectra of the phonetic chords of the set of phonetic chords, the stored data having been generated by a method comprising:

using one or more of the electronic processors:

(A) for each phonetic chord of the set of phonetic chords, spectrally analyzing multiple electronic waveforms derived from respective utterances of that phonetic chord by one or more human test subjects, the spectral analysis including, for each electronic waveform, estimation of a fundamental acoustic frequency and identification of two or more fundamental or harmonic components each having an intensity that exceeds the detection threshold and an acoustic frequency that is the fundamental acoustic frequency or a harmonic acoustic frequency that is equal to an integer multiple of the fundamental acoustic frequency;

(B) for each phonetic chord of the set of phonetic chords, identifying, as an expected primary cap frequency of the stored data indicative of harmonic frequencies expected for respective harmonic acoustic spectra, a highest harmonic acoustic frequency among the identified components of part (A) that is also greater than 410 Hz, and storing, on the computer-readable storage medium, electronic indicia of the expected primary cap frequency for each phonetic chord of the set of phonetic chords;

(C) wherein the stored data is generated by a method further comprising, for a subset of the phonetic chords having a common primary phonetic note, using the spectrally analyzed multiple electronic waveforms derived from multiple utterances at multiple different fundamental frequencies by the one or more human test subjects:

(i) for each phonetic chord of the subset of the phonetic chords, identifying, as an expected secondary cap frequency of the stored data indicative of harmonic frequencies expected for respective harmonic acoustic spectra, a highest harmonic frequency among the identified components of part (A) that is separated from the expected primary cap frequency for the respective phonetic chord by at least one intervening multiple of the fundamental acoustic frequency for which the acoustic spectrum lacks a harmonic component, and (ii) storing, on the computer-readable storage medium, electronic indicia of the expected secondary cap frequency for each phonetic chord of the subset of phonetic chords.

19. The computerized machine of claim 16 wherein the method that the machine is structured and programmed to perform uses a detection threshold comprising a frequency-dependent level that differs among the identified components.

20. A computer-implemented method for synthesizing audible human speech from text representing that speech, the method comprising:

using one or more of the electronic processors of a programmed computer system:

(a) for each of a plurality of harmonic phonetic chords of the text, using received, retrieved, or calculated data indicative of a primary phonetic note corresponding to the phonetic chord and a focal frequency of that primary phonetic note to determine a primary cap frequency using the focal frequency and a selected fundamental acoustic frequency, the primary cap frequency being (i) an integer multiple of the selected fundamental acoustic frequency, (ii) greater than 410 Hz, and (iii) closer to the focal frequency of the corresponding primary note than to focal frequencies of other phonetic notes;

(b) for each of the plurality of phonetic chords of the text, using the primary cap frequency determined in part (a) to form a corresponding harmonic electronic waveform segment that includes a harmonic component at the primary cap frequency, the primary cap frequency being greater than acoustic frequencies of all other harmonic components included in that electronic waveform segment; and (c) producing an electronic waveform comprising a temporal sequence including the harmonic electronic waveform segments formed in part (b), along with electronic waveform segments corresponding to inharmonic, silenced, or transitional segments of the text, wherein the electronic waveform, when applied to an electroacoustic transducer, is configured to produce sound of the human speech corresponding to the text.

21. The method of claim 20 further comprising applying the electronic waveform to the electroacoustic transducer, thereby producing the sound of the human speech.

22. The method of claim 20 further comprising, for a selected phonetic chord of part (a), including in the corresponding harmonic electronic waveform segment harmonic components of a primary band, the primary band including harmonic components at the primary cap frequency and at least three largest consecutive multiples of the fundamental acoustic frequency that are (i) less than the primary cap frequency, (ii) greater than 410 Hz, and (iii) greater than the smallest integer multiple of the fundamental acoustic frequency that is above 410 Hz and less than the primary cap frequency.

23. The method of claim 20 further comprising, for a selected phonetic chord of part (a):

(a) using received, retrieved, or calculated data indicative of a secondary phonetic note corresponding to the selected phonetic chord and a focal frequency of that secondary phonetic note, determining a secondary cap frequency using the focal frequency of that secondary phonetic note and the selected fundamental acoustic frequency, the secondary cap frequency being (i) an integer multiple of the selected fundamental acoustic frequency, (ii) greater than 410 Hz, and (iii) closer to the focal frequency of the corresponding secondary note than to focal frequencies of other phonetic notes; and (b) including in the corresponding harmonic electronic waveform segment one or more harmonic components of a secondary band, the secondary band including harmonic components at harmonic acoustic frequencies that are (i) greater than the smallest integer multiple of the fundamental acoustic frequency that is above 410 Hz and (ii) less than or equal to the secondary cap frequency.

24. The method of claim 20 further comprising, for a selected phonetic chord of part (a), including in the corresponding harmonic electronic waveform segment one or more harmonic components of a basal band, the basal band including harmonic components at one or more fundamental or harmonic acoustic frequencies that are (i) less than 410 Hz or (ii) equal to the smallest integer multiple of the fundamental acoustic frequency that is between 410 Hz and the primary cap frequency.

25. The method of claim 20 further comprising, for a selected phonetic chord of part (a), including in the corresponding harmonic electronic waveform segment one or more harmonic components of only a reduced basal band, the reduced basal band including only harmonic components at one or more fundamental or harmonic acoustic frequencies that are less than 410 Hz, and for the selected phonetic chord, including in the corresponding harmonic electronic waveform segment one or more inharmonic components.

26. An article comprising a tangible medium that is not a transitory propagating signal encoding computer-readable instructions that, when executed by one or more electronic processors of a computer system, instruct the one or more of the electronic processors of the computer system to perform a method of synthesizing audible human speech from text representing that speech, the method comprising:

(a) for each of a plurality of harmonic phonetic chords of the text, using received, retrieved, or calculated data indicative of a primary phonetic note corresponding to the phonetic chord and a focal frequency of that primary phonetic note to determine a primary cap frequency using the focal frequency and a selected fundamental acoustic frequency, the primary cap frequency being (i) an integer multiple of the selected fundamental acoustic frequency, (ii) greater than 410 Hz, and (iii) closer to the focal frequency of the corresponding primary note than to focal frequencies of other phonetic notes;

(b) for each of the plurality of phonetic chords of the text, using the primary cap frequency determined in part (a) to form a corresponding harmonic electronic waveform segment that includes a harmonic component at the primary cap frequency, the primary cap frequency being greater than acoustic frequencies of all other harmonic components included in that electronic waveform segment; and (c) producing an electronic waveform comprising a temporal sequence including the harmonic electronic waveform segments formed in part (b), along with electronic waveform segments corresponding to inharmonic, silenced, or transitional segments of the text, wherein the electronic waveform, when applied to an electroacoustic transducer, is configured to produce sound of the human speech corresponding to the text.

27. The article of claim 26 further comprising, for a selected phonetic chord of part (a):

(a) using received, retrieved, or calculated data indicative of a secondary phonetic note corresponding to the selected phonetic chord and a focal frequency of that secondary phonetic note, determining a secondary cap frequency using the focal frequency of that secondary phonetic note and the selected fundamental acoustic frequency, the secondary cap frequency being (i) an integer multiple of the selected fundamental acoustic frequency, (ii) greater than 410 Hz, and (iii) closer to the focal frequency of the corresponding secondary note than to focal frequencies of other phonetic notes; and (b) including in the corresponding harmonic electronic waveform segment one or more harmonic components of a secondary band, the secondary band including harmonic components at harmonic acoustic frequencies that are (i) greater than the smallest integer multiple of the fundamental acoustic frequency that is above 410 Hz and (ii) less than or equal to the secondary cap frequency.

* * * * *